United States Patent
Sato et al.

(10) Patent No.: US 7,590,032 B2
(45) Date of Patent: Sep. 15, 2009

(54) RECORDING MEDIUM, ACCESS APPARATUS, ACCESS METHOD, AND PROGRAM

(75) Inventors: Takahiro Sato, Osaka (JP); Hiroshi Ueda, Nara (JP); Mamoru Shoji, Osaka (JP); Motoshi Ito, Osaka (JP)

(73) Assignee: Panasonic Corporation, Kadoma (JP)

( * ) Notice: Subject to any disclaimer, the term of this patent is extended or adjusted under 35 U.S.C. 154(b) by 961 days.

(21) Appl. No.: 10/991,728

(22) Filed: Nov. 18, 2004

(65) Prior Publication Data
US 2005/0117460 A1 Jun. 2, 2005

(30) Foreign Application Priority Data
Nov. 19, 2003 (JP) ............... 2003-389102

(51) Int. Cl.
G11B 7/085 (2006.01)
G11B 7/24 (2006.01)

(52) U.S. Cl. ............... 369/30.03; 369/275.3; 369/47.52

(58) Field of Classification Search ............ 369/30.03, 369/275.3, 47.52, 47.53, 47.55, 53.37, 59.14
See application file for complete search history.

(56) References Cited

U.S. PATENT DOCUMENTS

| | | | |
|---|---|---|---|
| 5,706,271 A | 1/1998 | Hirokuni | |
| 6,411,575 B1 | 6/2002 | Akiyama et al. | |
| RE38,620 E | 10/2004 | Thomas | |
| 2002/0150012 A1 | 10/2002 | Hsiao et al. | |
| 2003/0086345 A1 | 5/2003 | Ueki | |

FOREIGN PATENT DOCUMENTS

| | | |
|---|---|---|
| CN | 1359516 A | 7/2002 |
| JP | 2004-141827 | 5/1992 |
| JP | 08-329468 | 12/1996 |
| JP | 09-016964 | 1/1997 |
| JP | 2000-293854 | 10/2000 |
| JP | 2000-293859 | 10/2000 |
| JP | 2001-184675 | 7/2001 |
| JP | 2002-293859 | 10/2002 |
| JP | 2003-203341 | 7/2003 |
| JP | 2006-519459 | 8/2006 |
| WO | 2004/079730 | 9/2004 |

OTHER PUBLICATIONS

Chinese Office Action for corresponding Application No. 200410047178.8 dated May 18, 2007 (including English translation).
Japanese Office Action for corresponding application No. 2004-336710 issued Mar. 11, 2009.
Japanese Office Action for corresponding application No. 2004-336710 issued Jun. 24, 2009.

*Primary Examiner*—Ali Neyzari
(74) *Attorney, Agent, or Firm*—Renner, Otto, Boisselle & Sklar, LLP

(57) ABSTRACT

A recording medium is provided, which comprises at least one recording area. The at least one recording area is composed of at least one adjustment area and at least one positional information recording area. The at least one adjustment area is an area for adjustment an access parameter for accessing the recording medium. Positional information indicating a position of the at least one adjustment area is recorded in the at least one positional information recording area.

13 Claims, 15 Drawing Sheets

RECORDING MEDIUM, ACCESS APPARATUS, ACCESS METHOD, AND PROGRAM

This nonprovisional application claims priority under 35 U.S.C. §119(a) on Patent Application No. 2003-389102 filed in Japan on Nov. 19, 2003, the entire contents of which are hereby incorporated by reference.

BACKGROUND OF THE INVENTION

1. Field of the Invention

The present invention relates to a recording medium, an apparatus for accessing a recording medium, a method for accessing a recording medium, and a program for executing the method.

2. Description of the Related Art

Recently, as the density and capacity of optical discs are increased, it is important to secure the reliability of the optical. In an optical disc apparatus, adjustment is performed in order to secure the reliability of an optical disc. By adjustment, conditions for recording/reproduction of an optical disc are obtained. The recording/reproduction conditions include a recording power condition indicating an optimum power of a semiconductor laser irradiating an optical disc with laser light when recording data there onto. The recording power condition is obtained by recording power adjustment.

Japanese Laid-Open Publication No. 4-141827 discloses an exemplary recording power adjustment. According to this technique, adjustment is performed as follows. A signal is recorded into an evaluation track on an optical disc by changing laser light gradually. It is determined whether the recorded signal is normal or abnormal. When the result of the determination is satisfactory, the lowest power is determined within a range in which the recorded signal is determined to be normal.

FIG. 11 shows a conventional recording power adjustment procedure. Hereinafter, the conventional recording power adjustment procedure will be described with reference to FIG. 11.

Step 1101: an adjustment area A is selected by selecting randomly a track for adjusting among evaluation tracks in an optical disc (adjustment area selection). The adjustment area selection procedure will be described elsewhere below.

Step 1102: a recording power for adjustment is determined. For example, at least one recording power is determined for adjustment using the selected track.

Step 1103: data is recorded into the adjustment area A. For example, when a plurality of recording powers are set, the selected adjustment area is divided into a plurality of areas and data is recorded into the areas using the respective different recording powers.

Step 1104: using the recorded areas, the degree of modulation of a reproduced signal is measured. The degree of modulation (modulation degree) is a value indicating the amplitude of a reproduced signal.

Step 1105: an optimum power is calculated based on the measured modulation degrees.

Step 1106: test recording is performed in the selected area using the calculated power.

Step 1107: the error rate of a test recorded area is measured.

Step 1108: it is determined whether or not the measured error rate is within a predetermined range. When it is determined that the error rate is within the predetermined range (YES), the process goes to step 1109. When it is determined that the error rate is not within the predetermined range (NO), the process goes to step 1102. Steps 1102 to 1108 are repeated.

Step 1109: an adjustment resultant power is set and adjustment is ended.

FIG. 12 shows a detailed procedure of the adjustment area selection. Hereinafter, the adjustment area selection procedure (step 1101) will be described step by step with reference to FIG. 12.

Step 1201: an adjustment area is selected at random.

Step 1202: test recording is performed on the selected adjustment area.

Step 1203: the error rate of the test recorded adjustment area is measured.

Step 1204: it is determined whether or not the measured error rate is within a predetermined range.

When it is determined that the error rate is within the predetermined range (YES), the process goes to end. When it is determined that the error rate is not within the predetermined range (NO), the process goes to step 1201 and the adjustment area selection is repeated.

Recording power adjustment is performed every time an optical disc apparatus is started up after an optical disc is loaded into the optical disc apparatus, or alternatively, every time characteristics of an optical disc or an optical disc apparatus are changed by more than a predetermined amount due to a factor, such as a change in temperature or the like.

Recording/reproduction conditions are determined using a drive test area provided in the inner peripheral area of an optical disc. An optical disc apparatus records/reproduces a loaded optical disc under the determined recording/reproduction conditions.

Japanese Laid-Open Publication No. 2000-293859 discloses an exemplary method for recording/reproducing information under predetermined recording/reproduction conditions. In this method, a predetermined optical disc is used for high-speed adjustment. The optical disc includes an area storing identification information about optical disc apparatuses and recording/reproduction conditions for each apparatus. When the identification information of an apparatus for recording or reproduction (hereinafter referred to as an optical disc apparatus) matches the stored identification information, recording or reproduction is performed using the stored recording/reproduction conditions.

In order to perform adjustment with high precision, it is desirable to select an area having good recording conditions as an adjustment area.

Recently, the capacity and density of optical discs and the speed of recording/reproduction have been further increased. Therefore, it is necessary to reduce the time required to perform adjustment for obtaining recording/reproduction conditions.

The drive test area of an optical disc is limited. Adjustment is required for determination of a recording power condition as well as various other recording/reproduction conditions. Therefore, it is necessary to use the drive test area efficiently.

SUMMARY OF THE INVENTION

According to an aspect of the present invention, a recording medium is provided, which comprises at least one recording area. The at least one recording area is composed of at least one adjustment area and at least one positional information recording area. The at least one adjustment area is an area for adjusting an access parameter for accessing the recording medium. Positional information indicating a position of the at least one adjustment area is recorded in the at least one positional information recording area.

In one embodiment of this invention, data for adjusting the access parameter is recorded in the at least one adjustment area, and usability information indicating whether or not each of the at least one adjustment areas can be used is recorded in the at least one positional information recording area.

In one embodiment of this invention, data for adjusting the access parameter is recorded in the at least one adjustment area, and the positional information indicates a position of an adjusted area in which the access parameter is already adjusted, and usability information indicating whether or not each of the at least one adjustment areas can be used is recorded in the at least one positional information recording area.

In one embodiment of this invention, the positional information and the usability information correspond to each other, and the usability information includes information indicating the number of times of adjustment in the adjustment area.

In one embodiment of this invention, the positional information and the usability information correspond to each other, and the usability information includes a value of measuring a signal for determining the usability of the adjustment area.

In one embodiment of this invention, the positional information and the usability information correspond to each other, and the usability information includes a bit sequence indicating the usability of the adjustment area.

In one embodiment of this invention, the at least one recording area includes at least one recorded area, and the positional information includes recorded area information indicating a position of the at least one recorded area.

In one embodiment of this invention, the at least one recording area is divided into a plurality of areas in a radial direction of the recording medium, and the positional information includes information indicating a position of a recorded area included in each of the plurality of areas.

In one embodiment of this invention, the at least one recording area is constructed to include an identification information recording area for recording identification information of an apparatus, the apparatus having been used for recording the positional information.

In one embodiment of this invention, the at least one positional information recording area includes a parameter for adjustment, the adjustment parameter corresponding to the positional information.

In one embodiment of this invention, the positional information recording area includes adjustment parameter usability information indicating whether or not the adjustment parameter can be used.

In one embodiment of this invention, the adjustment parameter usability information includes temperature information indicating a temperature when adjustment has been performed in the at least one adjustment area.

In one embodiment of this invention, the adjustment parameter usability information includes time information indicating a time when adjustment has been performed in the at least one adjustment area.

According to another aspect of the present invention, an access apparatus for accessing a recording medium including at least one recording area is provided. The at least one recording area is composed of at least one adjustment area and at least one positional information recording area. The at least one adjustment area is an area for adjusting an access parameter for accessing the recording medium. Positional information indicating a position of the at least one adjustment area is recorded in the at least one positional information recording area. The access apparatus comprises an access section for accessing the recording medium, an obtaining section for obtaining the positional information from the at least one positional information recording area according to a result of the access, and an adjustment section for adjusting the access parameter in the at least one adjustment area according to the obtained positional information.

In one embodiment of this invention, data for adjusting the access parameter is recorded in the at least one adjustment area, usability information indicating whether or not each of the at least one adjustment areas can be used is recorded in the at least one positional information recording area, and the positional information and the usability information correspond to each other. The obtaining section comprises a selection section for selecting an adjustment area from the at least one adjustment area, wherein the usability information indicates that the adjustment area can be used, and an adjustment area setting section for setting the selected adjustment area.

In one embodiment of this invention, the usability information includes information indicating the number of times of adjustment in the adjustment area, and the selection section selects an adjustment area having a smallest number of times of adjustment.

In one embodiment of this invention, the usability information includes a value of measuring a signal for determining the usability of the adjustment area, and the selection section selects an adjustment area having a measurement value smaller than a predetermined value.

In one embodiment of this invention, the usability information includes a bit sequence indicating the usability of the adjustment area, and the selection section selects an adjustment area, wherein a bit corresponding to the adjustment area indicates that the adjustment area can be used.

In one embodiment of this invention, the at least one positional information recording area includes a parameter for adjustment, the adjustment parameter corresponding to the positional information, and the adjustment area setting section sets the adjustment parameter, wherein adjustment is performed using the adjustment parameter.

In one embodiment of this invention, the positional information recording area includes adjustment parameter usability information indicating whether or not the adjustment parameter can be used, and the adjustment area setting section includes a usability determination section determining whether or not the adjustment parameter can be used, based on the adjustment parameter usability information, and the adjustment area setting section sets a usable adjustment parameter based on a result of determination of the usability determination section.

In one embodiment of this invention, the adjustment parameter usability information includes first temperature information indicating a first temperature when adjustment is performed in the at least one adjustment area. The access apparatus further comprises a temperature measurement section for measuring a second temperature of inside of the access apparatus. The adjustment area setting section determines whether or not a difference between the first temperature and the second temperature is equal to or less than a predetermined value, wherein when the difference is equal to or less than the predetermined value, the adjustment parameter is set.

In one embodiment of this invention, the adjustment parameter usability information includes first time information indicating a first time when adjustment is performed in the at least one adjustment area. The access apparatus further comprises a time measurement section for measuring a second time. The adjustment area setting section determines whether or not a difference between the first time and the second time is equal to or less than a predetermined value, wherein when the difference is equal to or less than the predetermined value, the adjustment parameter is set.

In one embodiment of this invention, the at least one recording area includes at least one recorded area. The positional information includes recorded area information indicating a position of the at least one recorded area. The access apparatus further comprises a head position obtaining section for obtaining a current position of a head. The selection section selects the adjustment area based on a positional relationship between the current head position and the recorded area.

In one embodiment of this invention, the selection section selects an area closest to the current head position in a radial direction.

In one embodiment of this invention, the adjustment area selection section selects an area which can be reached in a shortest time from the current head position.

In one embodiment of this invention, the at least one recording area is divided into a plurality of areas in a radial direction of the recording medium. The positional information includes information indicating a position of a recorded area included in each of the plurality of areas. The selection section selects an area, to which the current head position belongs, from the plurality of areas, and a recorded area, which is registered in the area to which the current head position belongs, from the recorded areas included in the positional information.

In one embodiment of this invention, the access apparatus further comprises a reference position calculation section for calculating reference positions spaced substantially equally in a radial direction of the recording medium. Te selection section obtains a near reference position closest to the current head position, and selects a recorded area closest to the near reference position from the recorded areas included in the positional information.

In one embodiment of this invention, the at least one recording area further includes an identification information recording area, in which first identification information of an apparatus used to record the positional information is recorded. The access apparatus further comprises a section for storing second identification information of the access apparatus, and an identification information determination section for determining whether or not the first identification information matches the second identification information. The selection section selects an adjustment area based on the positional information corresponding to the second identification information when the first identification information matches the second identification information.

According to another aspect of the present invention, an access method for accessing a recording medium including at least one recording area is provided. The at least one recording area is composed of at least one adjustment area and at least one positional information recording area. The at least one adjustment area is an area for adjusting an access parameter for accessing the recording medium. Positional information indicating a position of the at least one adjustment area is recorded in the at least one positional information recording area. The access method comprises accessing the recording medium, obtaining the positional information from the at least one positional information recording area according to a result of the access, and adjusting the access parameter in the at least one adjustment area according to the obtained positional information.

In one embodiment of this invention, data for adjusting the access parameter is recorded in the at least one adjustment area, usability information indicating whether or not each of the at least one adjustment areas can be used is recorded in the at least one positional information recording area, and the positional information and the usability information correspond to each other. The obtaining step comprises selecting an adjustment area from the at least one adjustment area, wherein the usability information indicates that the adjustment area can be used, and setting the selected adjustment area.

In one embodiment of this invention, the at least one recording area includes at least one recorded area. The positional information includes recorded area information indicating a position of the at least one recorded area. The access method further comprises obtaining a current position of ahead. The obtaining step selects the adjustment area based on a positional relationship between the current head position and the recorded area.

In one embodiment of this invention, the at least one recording area is divided into a plurality of areas in a radial direction of the recording medium. The positional information includes information indicating a position of a recorded area included in each of the plurality of areas. The selecting step comprises selecting an area, to which the current head position belongs, from the plurality of areas, and a recorded area, which is registered in the area to which the current head position belongs, from the recorded areas included in the positional information.

According to another aspect of the present invention, a program for causing a computer to execute an access process for accessing a recording medium including at least one recording area is provided. The at least one recording area is composed of at least one adjustment area and at least one positional information recording area. The at least one adjustment area is an area for adjusting an access parameter for accessing the recording medium. Positional information indicating a position of the at least one adjustment area is recorded in the at least one positional information recording area. The access process comprises accessing the recording medium, obtaining the positional information from the at least one positional information recording area according to a result of the access, and adjusting the access parameter in the at least one adjustment area according to the obtained positional information.

In one embodiment of this invention, data for adjusting the access parameter is recorded in the at least one adjustment area, usability information indicating whether or not each of the at least one adjustment areas can be used is recorded in the at least one positional information recording area, and the positional information and the usability information correspond to each other. The obtaining step comprises selecting an adjustment area from the at least one adjustment area, wherein the usability information indicates that the adjustment area can be used, and setting the selected adjustment area.

In one embodiment of this invention, the at least one recording area includes at least one recorded area. The positional information includes recorded area information indicating a position of the at least one recorded area. The access process further comprises obtaining a current position of ahead. The obtaining step selects the adjustment area based on a positional relationship between the current head position and the recorded area.

In one embodiment of this invention, the at least one recording area is divided into a plurality of areas in a radial direction of the recording medium. The positional information includes information indicating a position of a recorded area included in each of the plurality of areas. The selecting step comprises selecting an area, to which the current head position belongs, from the plurality of areas, and a recorded area, which is registered in the area to which the current head position belongs, from the recorded areas included in the positional information.

According to another aspect of the present invention, an access apparatus for accessing a recording medium including at least one recording area is provided. The at least one recording area is composed of at least one adjustment area and at least one positional information recording area. The at least one adjustment area is an area for adjusting an access parameter for accessing the recording medium. Positional information indicating a position of the at least one adjustment area is recorded in the at least one positional information recording area. The access apparatus comprises an access section for accessing the recording medium, a generating section for generating the positional information according to a result of the access, and a recording section for recording the generated positional information into the at least one positional information recording area.

In one embodiment of this invention, the generating section comprises a usability information generating section for generating usability information indicating whether or not each of the at least one adjustment areas can be used. The recording section comprises a usability information recording section for recording the generated usability information into the at least one positional information recording area.

In one embodiment of this invention, the usability information generating section comprises a number-of-times measuring section for measuring the number of times of adjustment in the at least one adjustment area. The usability information recording section comprises a section for recording number-of-times information indicating the measured number of times into the at least one positional information recording area in association with the positional information.

In one embodiment of this invention, the usability information generating section comprises a determining section for determining whether or not the at least one adjustment area can be used. The usability information recording section comprises a section for recording result information indicating a result of the determination into the at least one positional information recording area in association with the positional information.

In one embodiment of this invention, the usability information generating section comprises setting a bit sequence indicating the usability of the at least one adjustment area. The usability information recording section comprises a section for recording the set bit sequence into the at least one positional information recording area in association with the positional information.

In one embodiment of this invention, the usability information generating section comprises a parameter generating section for generating an adjustment parameter for adjustment, the adjustment parameter corresponding to the positional information. The usability information recording section comprises a section for recording the adjustment parameter into the at least one positional information recording area.

In one embodiment of this invention, the parameter generating section comprises a section for selecting a parameter indicating a result of adjustment already performed in the at least one adjustment area indicated by the positional information.

In one embodiment of this invention, the at least one recording area is divided into a plurality of areas in a radial direction of the recording medium. The positional information includes information indicating a position of a recorded area included in each of the plurality of areas. The parameter generating section comprises a section for selecting at least one adjustment parameter from adjustment parameters respectively corresponding to the plurality of areas.

In one embodiment of this invention, the usability information generating section further comprises a section for determining whether or not the adjustment parameter can be used, and a section for recording information indicating a result of the determination into the at least one positional information recording area in association with the adjustment parameter.

In one embodiment of this invention, the access apparatus further comprises a temperature measuring section for measuring a temperature when adjustment has been performed in the at least one adjustment area. The usability information recording section comprises a temperature information storing section for recording temperature information indicating the temperature into the at least one positional information recording area.

In one embodiment of this invention, the access apparatus further comprises a time measuring section for measuring a time when adjustment has been performed in the at least one adjustment area. The usability information recording section comprises a temperature information storing section for recording time information indicating the time into the at least one positional information recording area.

In one embodiment of this invention, the generating section comprises a section for selecting an area, in which adjustment has been completed, from the at least one adjustment area. The recording section comprises a section for recording adjusted area positional information indicating a position of the selected adjusted area into the at least one positional information recording area, and a section for recording information indicating whether or not the adjusted area can be used, into the at least one positional information recording area.

In one embodiment of this invention, the usability information generating section comprises a number-of-times measuring section for measuring the number of times of adjustment in the at least one adjustment area. The usability information recording section comprises a section for recording number-of-times information indicating the measured number of times into the at least one positional information recording area in association with the positional information.

In one embodiment of this invention, the usability information generating section comprises a determining section for determining whether or not the at least one adjustment area can be used. The usability information recording section comprises a section for recording result information indicating a result of the determination into the at least one positional information recording area in association with the positional information.

In one embodiment of this invention, the usability information generating section comprises setting a bit sequence indicating the usability of the at least one adjustment area. The usability information recording section comprises a section for recording the set bit sequence into the at least one positional information recording area in association with the positional information.

In one embodiment of this invention, the at least one adjustment area each has at least one area. The generating section comprises a section for selecting an area, in which recording has been completed, from the at least one area. The recording section comprises an area positional information recording section for recording recorded area positional information indicating a position of the selected recorded area into the at least one positional information recording area.

In one embodiment of this invention, the at least one recording area is divided into a plurality of areas in a radial direction of the recording medium. The positional information includes information indicating a position of a recorded area included in each of the plurality of areas. The area positional information recording section comprises an area determining section for determining an area including the recorded area among the plurality of areas, and a section for recording area information indicating the determined area into the at least one positional information recording area.

In one embodiment of this invention, the recording section comprises a section for recording identification information about the access apparatus into the at least one positional information recording area in association with positional information recorded by the access apparatus.

According to another aspect of the present invention, an access method for accessing a recording medium including at least one recording area is provided. The at least one recording area is composed of at least one adjustment area and at least one positional information recording area. The at least one adjustment area is an area for adjusting an access parameter for accessing the recording medium. Positional information indicating a position of the at least one adjustment area is recorded in the at least one positional information recording area. The access method comprises accessing the recording medium, generating the positional information according to a result of the access, and recording the generated positional information into the at least one positional information recording area.

In one embodiment of this invention, the generating step comprises generating usability information indicating whether or not each of the at least one adjustment areas can be used. The recording step comprises recording the generated usability information into the at least one positional information recording area.

In one embodiment of this invention, the generating step comprises selecting an area, in which adjustment has been completed, from the at least one adjustment area. The recording step comprises recording adjusted area positional information indicating a position of the selected adjusted area into the at least one positional information recording area, and recording information indicating whether or not the adjusted area can be used, into the at least one positional information recording area.

In one embodiment of this invention, the at least one adjustment area each has at least one area. The generating step comprises selecting an area, in which recording has been completed, from the at least one area. The recording step comprises recording recorded area positional information indicating a position of the selected recorded area into the at least one positional information recording area.

In one embodiment of this invention, the at least one recording area is divided into a plurality of areas in a radial direction of the recording medium. The positional information includes information indicating a position of a recorded area included in each of the plurality of areas. The area positional information recording step comprises determining an area including the recorded area among the plurality of areas, and recording area information indicating the determined area into the at least one positional information recording area.

According to another aspect of the present invention, a program for causing a computer to execute an access process for accessing a recording medium including at least one recording area is provided. The at least one recording area is composed of at least one adjustment area and at least one positional information recording area. The at least one adjustment area is an area for adjusting an access parameter for accessing the recording medium. Positional information indicating a position of the at least one adjustment area is recorded in the at least one positional information recording area. The access method comprises accessing the recording medium, generating the positional information according to a result of the access, and recording the generated positional information into the at least one positional information recording area.

In one embodiment of this invention, the generating step comprises generating usability information indicating whether or not each of the at least one adjustment areas can be used. The recording step comprises recording the generated usability information into the at least one positional information recording area.

In one embodiment of this invention, the generating step comprises selecting an area, in which adjustment has been completed, from the at least one adjustment area. The recording step comprises recording adjusted area positional information indicating a position of the selected adjusted area into the at least one positional information recording area, and recording information indicating whether or not the adjusted area can be used, into the at least one positional information recording area.

In one embodiment of this invention, the at least one adjustment area each has at least one area. The generating step comprises selecting an area, in which recording has been completed, from the at least one area. The recording step comprises recording recorded area positional information indicating a position of the selected recorded area into the at least one positional information recording area.

In one embodiment of this invention, the at least one recording area is divided into a plurality of areas in a radial direction of the recording medium. The positional information includes information indicating a position of a recorded area included in each of the plurality of areas. The area positional information recording step comprises determining an area including the recorded area among the plurality of areas, and recording area information indicating the determined area into the at least one positional information recording area.

Thus, the invention described herein makes possible the advantages of providing a recording medium, an access apparatus, an access method, and a program of the same, which can perform high-precision adjustment or can reduce an adjustment time.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Embodiment 1

Figure 1:
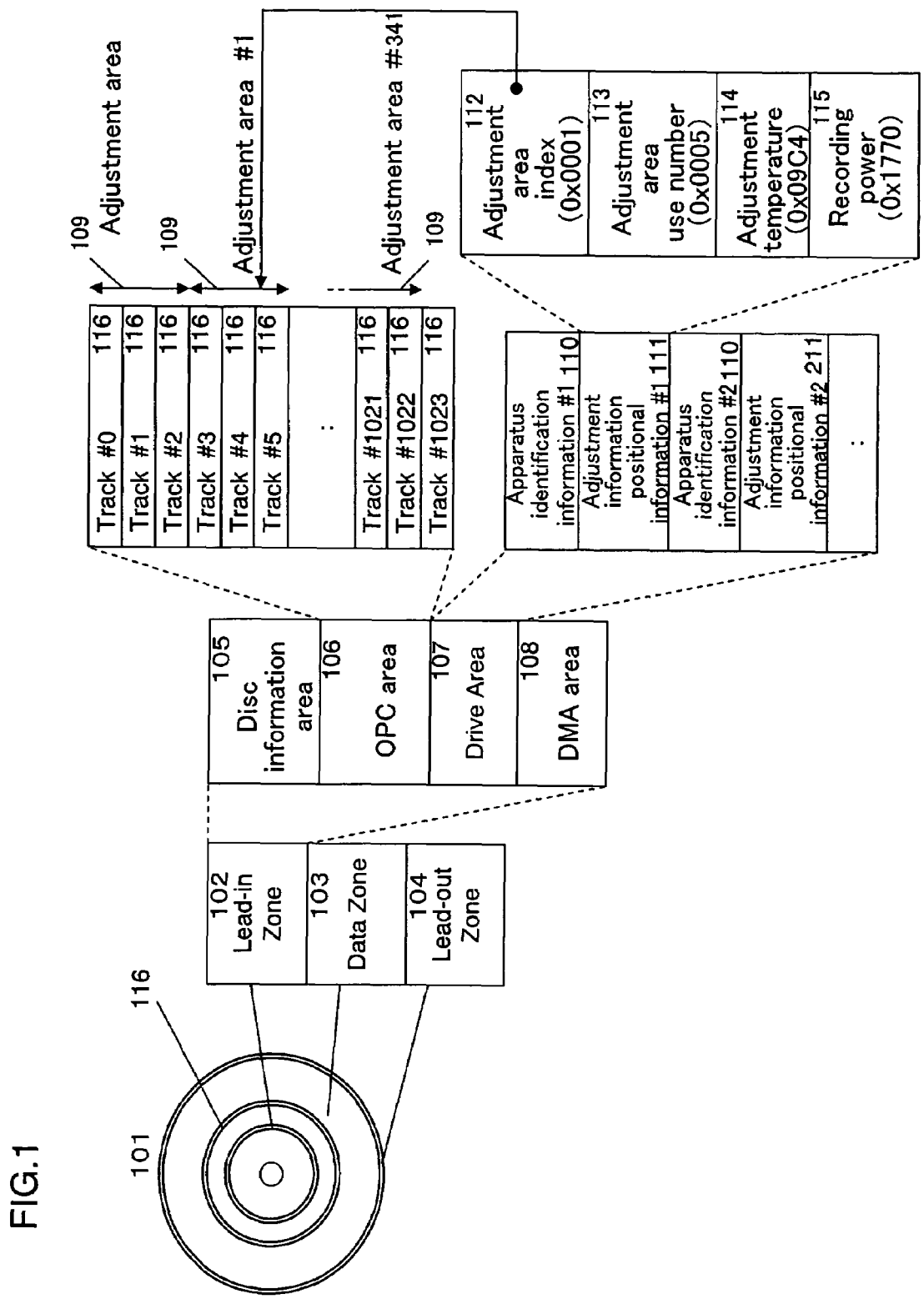
FIG. 1 is a diagram showing a structure of a recording medium according to Embodiment 1 of the present invention.

FIG. 1 shows a structure of a recording medium 101 according to Embodiment 1 of the present invention. The recording medium 101 may be any optical disc (e.g., a Blu-ray Disc).

On the recording medium 101, a plurality of tracks 116 are provided in the shape of concentric circles or a spiral. The recording medium 101 includes a Lead-in Zone 102, a Data Zone 103, and a Lead-out Zone 104.

Data is recorded/reproduced onto/from the Data Zone 103. Disc management information and defect management information are recorded in the Lead-out Zone 104.

The Lead-in Zone 102 includes a disc information area 105, an OPC area 106, a Drive Area 107, and a DMA area 108.

In the disc information area 105, disc-specific information, such as recording/reproduction conditions or the like, which is defined by a disc manufacturer, is recorded.

A plurality of tracks 116 are provided in the OPC area 106. The OPC area 106 includes at least one adjustment area 109, in which data is recorded during adjustment. By adjustment, a parameter for accessing the recording medium 101 is determined. The adjustment area 109 includes three continuous tracks 116. Note that numeral figures following # indicate an index number of the track 116 or the adjustment area 109.

In the above-described example, the adjustment area 109 is included in the OPC area 106. The present invention is not limited to this. The adjustment area 109 may be included in an area of the Lead-in Zone 102 other than the OPC area 106. Alternatively, the adjustment area 109 may be included in the Data Zone 103 or the Lead-out Zone 104.

Defect management information of the recording medium 101 is recorded in the DMA area 108.

At least one set of apparatus identification information 110 and adjustment area positional information 111 are recorded in the Drive Area 107. The apparatus identification information 110 includes information specific to an apparatus which has performed adjustment on the recording medium 101. The adjustment area positional information 111 indicates a position of the adjustment area 109, at which the apparatus has performed adjustment, and conditions used in the adjustment. Note that one piece of the apparatus identification information 110 is not necessarily associated with one piece of the adjustment area positional information 111. One piece of the apparatus identification information 110 may be associated with a plurality of pieces of the adjustment area positional information 111.

The adjustment area positional information 111 indicates an adjustment area index 112, an adjustment area use number 113, an adjustment temperature 114, and a recording power 115. A value in "( )" of each of the adjustment area index 112, the adjustment area use number 113, the adjustment temperature 114, or the recording power 115 indicates a value stored therein. "0x" indicates that a value in "( )" is a hexadecimal number.

The adjustment area index 112 indicates a position of the adjustment area 109 in the OPC area 106. For example, in FIG. 1, the adjustment area index 112 is an adjustment area #1. Note that the adjustment area index 112 may be a leading address of the adjustment area 109.

The adjustment area use number 113 indicates the number of times of use of an area indicated by the adjustment area index 112. The adjustment area use number 113 is used to determine the presence or absence of use of an adjustment area. For example, in FIG. 1, the adjustment area use number 113 is five. Note that an error rate when recording/reproduction is performed in the adjustment area 109 may be stored in the area used in determination of the presence or absence of the adjustment area 109.

The recording power 115 is a parameter of a recording power used in adjustment performed in an area indicated by the adjustment area index 112. For example, a recording power is represented in units of μW. In FIG. 1, the recording power 115 indicates "0x1770", i.e., 6.0 mW. Note that the recording power 115 may indicate another parameter for adjustment in addition to or instead of a recording power. For example, the recording power 115 may indicate a recording pulse width or a servo parameter.

The adjustment temperature 114 is a temperature at which adjustment is performed in an area indicated by the adjustment area index 112. The adjustment temperature 114 is used to determine the presence or absence of an adjustment parameter. For example, the adjustment temperature 114 stores a value obtained by multiplying the temperature by 100. In FIG. 1, the adjustment temperature 114 is "0x9C4", i.e., 25° C.

Alternatively, the presence or absence of use of an adjustment parameter may be determined as follows. Time information indicating when the previous adjustment was performed in the adjustment area 109 is stored in an area used for determination of the presence or absence of use of an adjustment parameter. The presence or absence of use of an adjustment parameter may be determined based on an elapsed time from the previous adjustment.

When an information recording medium has the above-described adjustment area positional information, adjustment can be performed in an area indicated by the adjustment area index 112 stored in the adjustment area positional information 111 in the second or more adjustment. Thereby, adjustment area selection can be omitted when adjustment, resulting in a reduction in adjustment time. As long as conditions which allow use of an adjustment area are satisfied, the same area can be used for adjustment. Therefore, the number of adjustment areas which have been used for adjustment can be reduced. Therefore, when an adjustment area is selected at random, the possibility that the selected area is not usable can be reduced and the number of areas which can be used for adjustment to obtain other recording/reproduction conditions can be increased.

Embodiment 2

Figure 2:
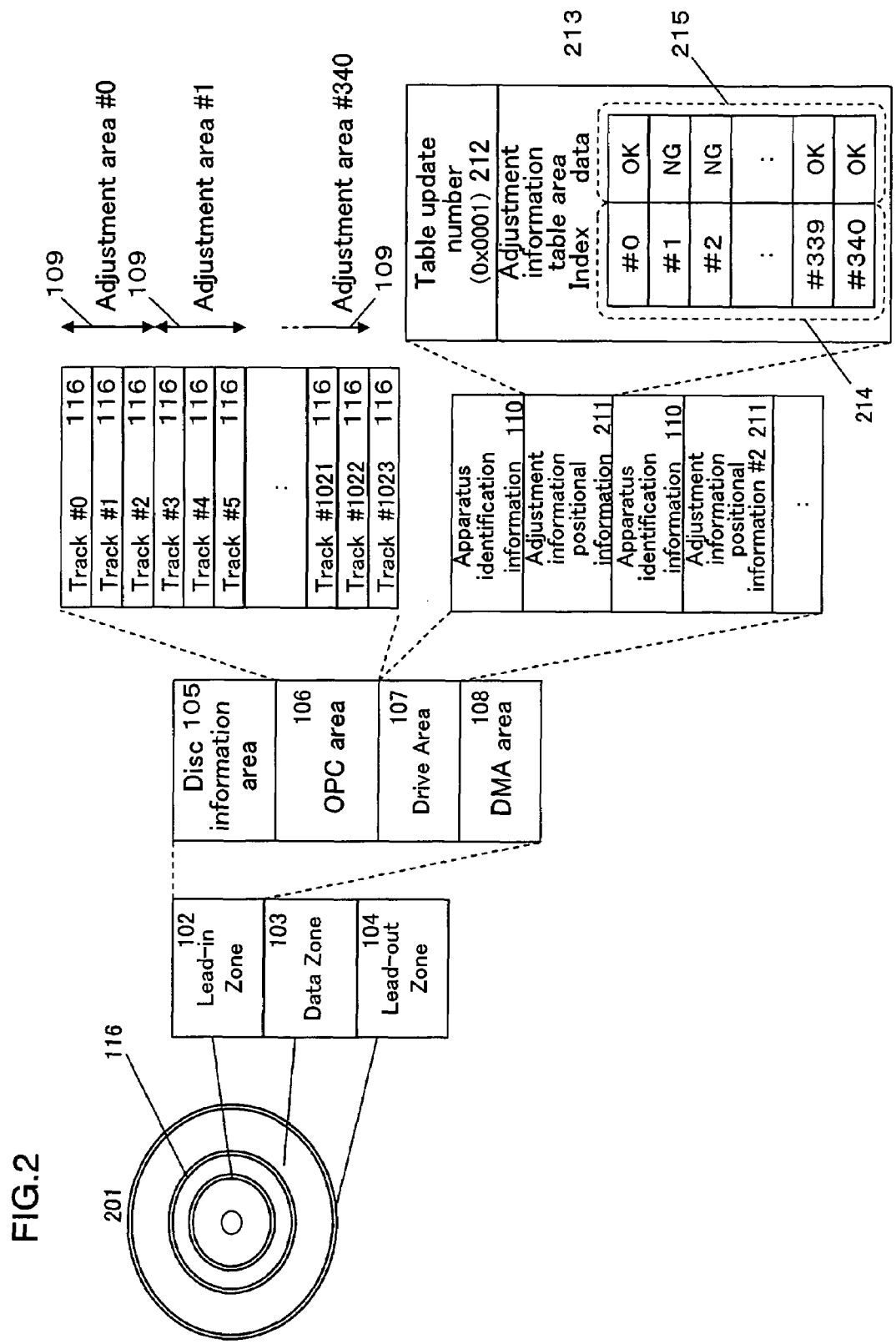
FIG. 2 is a diagram showing a structure of a recording medium according to Embodiment 2 of the present invention.

FIG. 2 shows a structure of a recording medium 201 according to Embodiment 2 of the present invention. The recording medium 201 maybe any optical disc (e.g., a Blu-ray Disc). In FIG. 2, the same parts as those of the recording medium 101 of FIG. 1 are referenced with the same reference numerals and will not be explained.

The adjustment area positional information 211 includes an adjustment area table 213, and a table update number 212 indicating the number of times that the adjustment area table 213 has been updated.

The adjustment area table 213 includes an area index 214 and data 215. The area index 214 indicates index information about the adjustment area 109, particularly any one of #0 to #340 of the adjustment area 109 in Embodiment 2. Note that the area index 214 may be a leading address of the adjustment area 109. The data 215 includes conditions which allow use of the adjustment area 109 for each area index. In Embodiment 2, character strings, such as "OK" and "NG", are stored as a condition for use of the adjustment area 109.

In the data 215, character strings, such as "OK" and "NG", are used as the condition for use of the adjustment area 109. The condition for use of the adjustment area 109 may be represented in other ways. For example, "OK" and "NG" maybe replaced with specific values "0" and "1", respectively. In FIG. 2, "0x0001", i.e., "once" is stored as the table update number 212.

According to the above-described recording medium of the present invention, the adjustment area table 213 stored in the adjustment area positional information 211 is used to perform adjustment area selection when performing adjustment. Therefore, adjustment can be performed in an area which has a small number of times of recording, so that high precision adjustment can be performed with less influence from a degradation in a recording medium due to previously performed recording.

Note that an area may be provided to store conditions for determination of the presence or absence of use of an adjustment area, information about an area in which adjustment is previously performed, an adjustment parameter, or conditions for use of an adjustment parameter, which are described in Embodiment 1.

Embodiment 3

Figure 3:
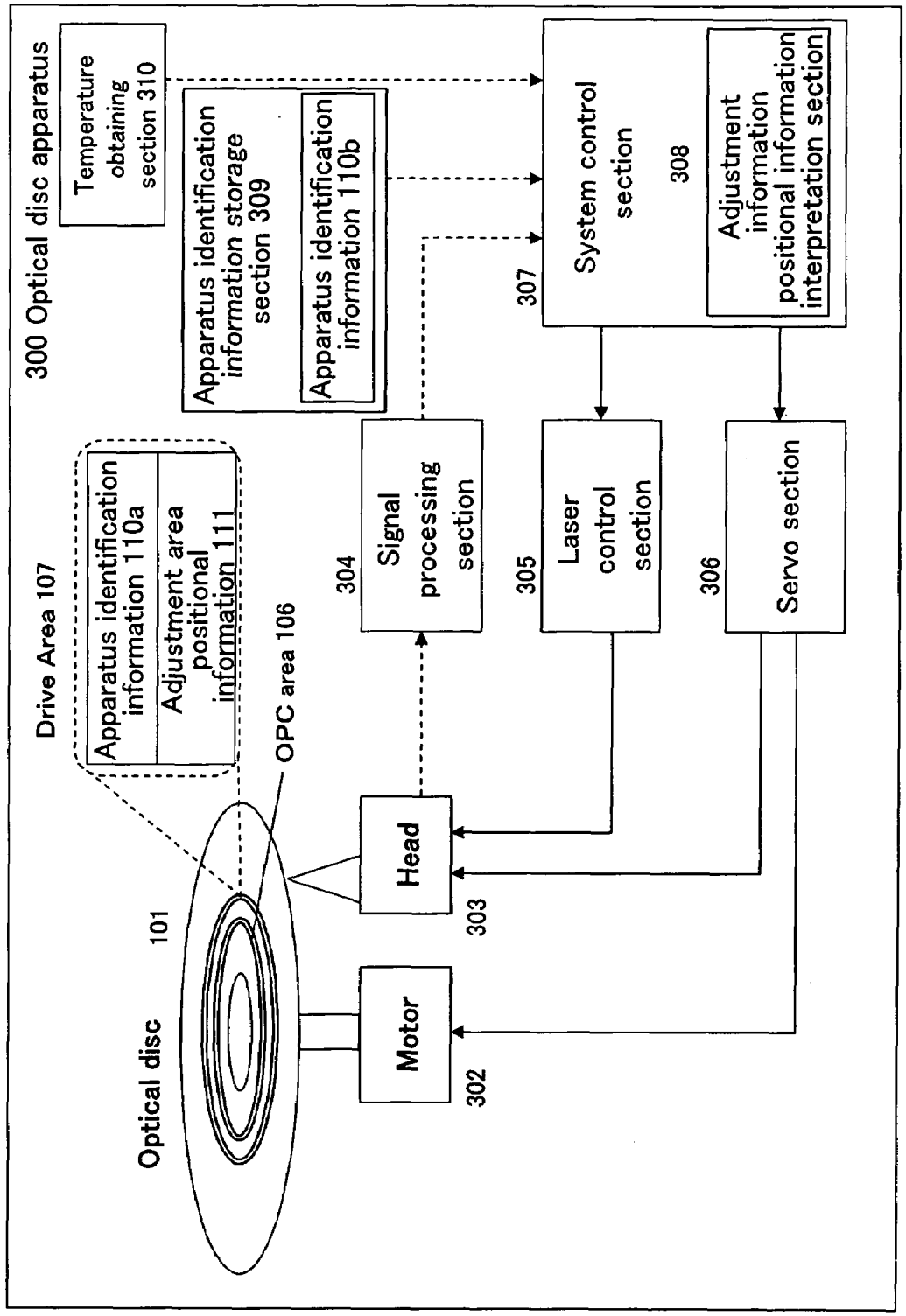
FIG. 3 is a diagram showing a structure of a recording medium according to Embodiment 3 of the present invention.

FIG. 3 shows a configuration of an optical disc apparatus according to Embodiment 3 of the present invention. The optical disc apparatus 300 is configured so that an optical disc 101 (see FIG. 1) can be loaded there into.

The optical disc apparatus 300 comprises a motor 302 for driving the optical disc 101, ahead 303 for irradiating the optical disc 101 with laser light, a signal processing section 304 for generating a binary signal or a clock from a signal read out using the head 303, a laser control section 305 for setting a power or a pulse width of laser output from the head 303, a servo section 306 for controlling a rotational speed of the motor 302 or an operation of the head 303, a system control section 307, an adjustment area positional information interpretation section 308, an apparatus identification information storage section 309 for storing apparatus identification information 110b which is an ID specific to the optical disc apparatus 300, and a temperature obtaining section 310.

The system control section 307 sets a laser power which is applied to the laser control section 305, issues a control command to the servo section 306, controls an operation of the whole optical disc apparatus 300, interprets a signal read out from the signal processing section 304, and obtains data from the optical disc 101. The adjustment area positional information interpretation section 308 interprets apparatus identification information 110a and adjustment area positional information 111 on the optical disc 101 to set an area of the OPC area 106 for adjustment and an adjustment parameter to the system control section 307.

Note that the apparatus identification information storage section 309 may be present in a memory of the system control section 307. The optical disc apparatus 300 is also connected via a communication means to a host block (e.g., a host PC) to perform transmission/reception of data and commands.

In Embodiment 3, the adjustment area positional information interpretation section 308 is incorporated in the system control section 307 of the optical disc apparatus 300. Alternatively, the adjustment area positional information interpretation section 308 may be present as an independent section in the optical disc apparatus 300, or may be incorporated in other sections. The adjustment area positional information interpretation section 308 may be present as a step in a program constituting the sections.

Figure 4:
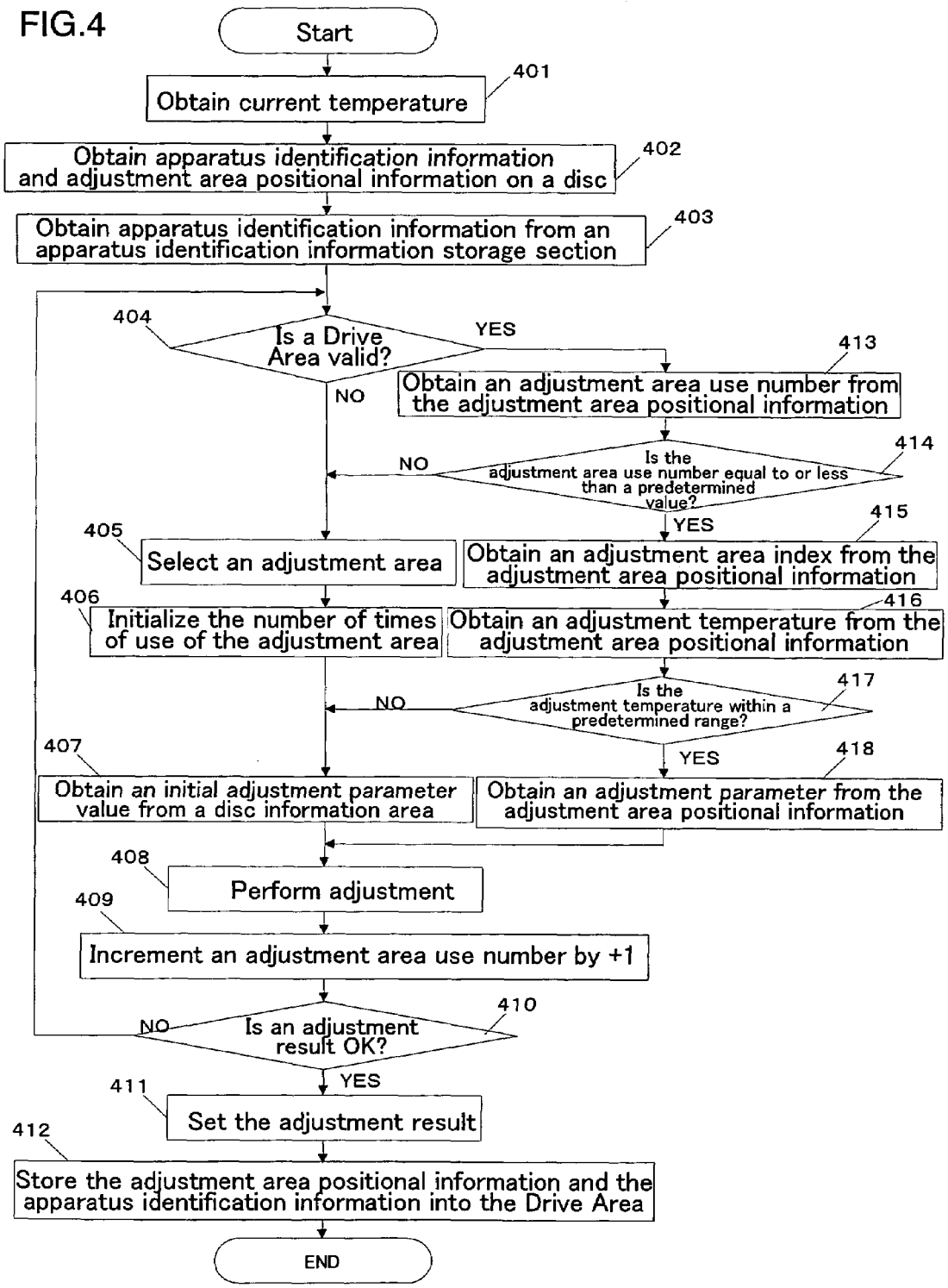
FIG. 4 is a flowchart showing a procedure for recording power adjustment.

FIG. 4 shows a procedure for recording power adjustment. Hereinafter, the recording power adjustment procedure will be described step by step with reference to FIGS. 1, 3 and 4. The recording power adjustment procedure is performed with respect to the recording medium 101 by the optical disc apparatus 300.

Step 401: a current temperature is obtained from the temperature obtaining section 310.

Step 402: a set of the apparatus identification information 110a and the adjustment area positional information 111 stored in the Drive Area 107 are obtained by converting a signal read by the head 303 to a binary signal using the signal processing section 304 and interpreting the binary signal using the system control section 307.

Step 403: the apparatus identification information 110b is obtained from the apparatus identification information storage section 309.

Step 404: the apparatus identification information 110a is compared with the apparatus identification information 110b to determine whether or not information of the Drive Area 107 is valid. When the apparatus identification information 110a matches the apparatus identification information 110b, it is determined that the data of the Drive Area 107 is valid. If not, the data of the Drive Area 107 is determined to be invalid.

When it is determined that the data of the Drive Area 107 is valid (YES), the process goes to step 413. When it is determined that the data of the Drive Area 107 is invalid (NO), the process goes to step 405.

Step 405: an adjustment area is selected. Adjustment area selection is performed by performing test recording in areas selected randomly and measuring error rates of the areas as described regarding the conventional technology.

Step 406: an adjustment area use number is initialized to 0. After initialization, the process goes to step 407.

Step 407: an initial adjustment parameter value is obtained from the disc information area 105.

Step 413: the adjustment area use number is obtained from the adjustment area positional information 111.

Step 414: it is determined whether or not the adjustment area use number is equal to or less than a predetermined value. When it is determined that the adjustment area use number is not equal to or less than the predetermined value (NO), the process goes to step 405. When it is determined that the adjustment area use number is equal to or less than the predetermined value (YES), the process goes to step 415.

Step 415: an adjustment index is obtained from the adjustment area positional information 111.

Step 416: an adjustment temperature is obtained.

Step 417: it is determined whether or not the adjustment temperature is within a predetermined range. When it is determined that the adjustment temperature is not within the predetermined range (NO), the process goes to step 407. When the adjustment temperature is within the predetermined range (YES), the process goes to step 418.

Step 418: an adjustment parameter is obtained from the adjustment area positional information. After that, the process goes to step 408.

Step 408: adjustment is performed in accordance with the procedure described regarding the conventional technology, where an area selected in step 415 or an area obtained in step 405 is used as an adjustment area, an adjustment parameter obtained in step 418 or 407 as an initial value for adjustment is used. In other words, recording is performed in an adjustment area using an initial adjustment parameter value, and using a modulation degree measured from the area, an optimum power is calculated.

After completion of adjustment, the process goes to step 409.

Step 409: the adjustment area use number is incremented by "+1".

Step 410: it is determined whether or not a result of adjustment is within a predetermined range. When it is determined that the adjustment result is within the predetermined range (YES), the adjustment resultant power is selected and the process goes to step 411. When the adjustment result is not within the predetermined range (NO), the process goes to step 404, and adjustment area selection and adjustment are repeated.

Step 411: the result of adjustment is set in the laser control section 304.

Step 412: the adjustment area positional information and the apparatus identification information are stored in the Drive Area 107. The process then goes to end.

Figure 11:
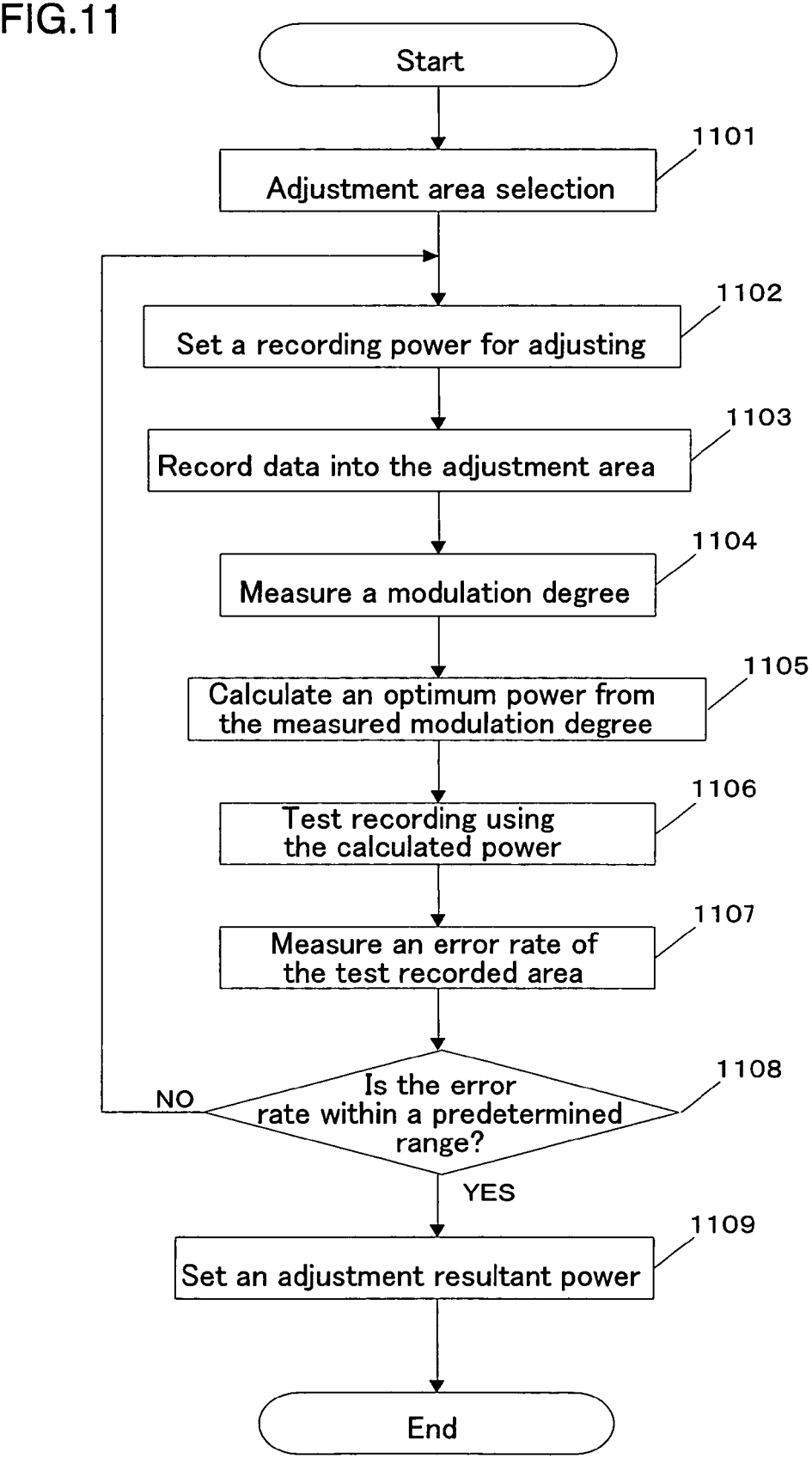
FIG. 11 is a flowchart showing a procedure of a conventional recording power adjustment.
Figure 12:
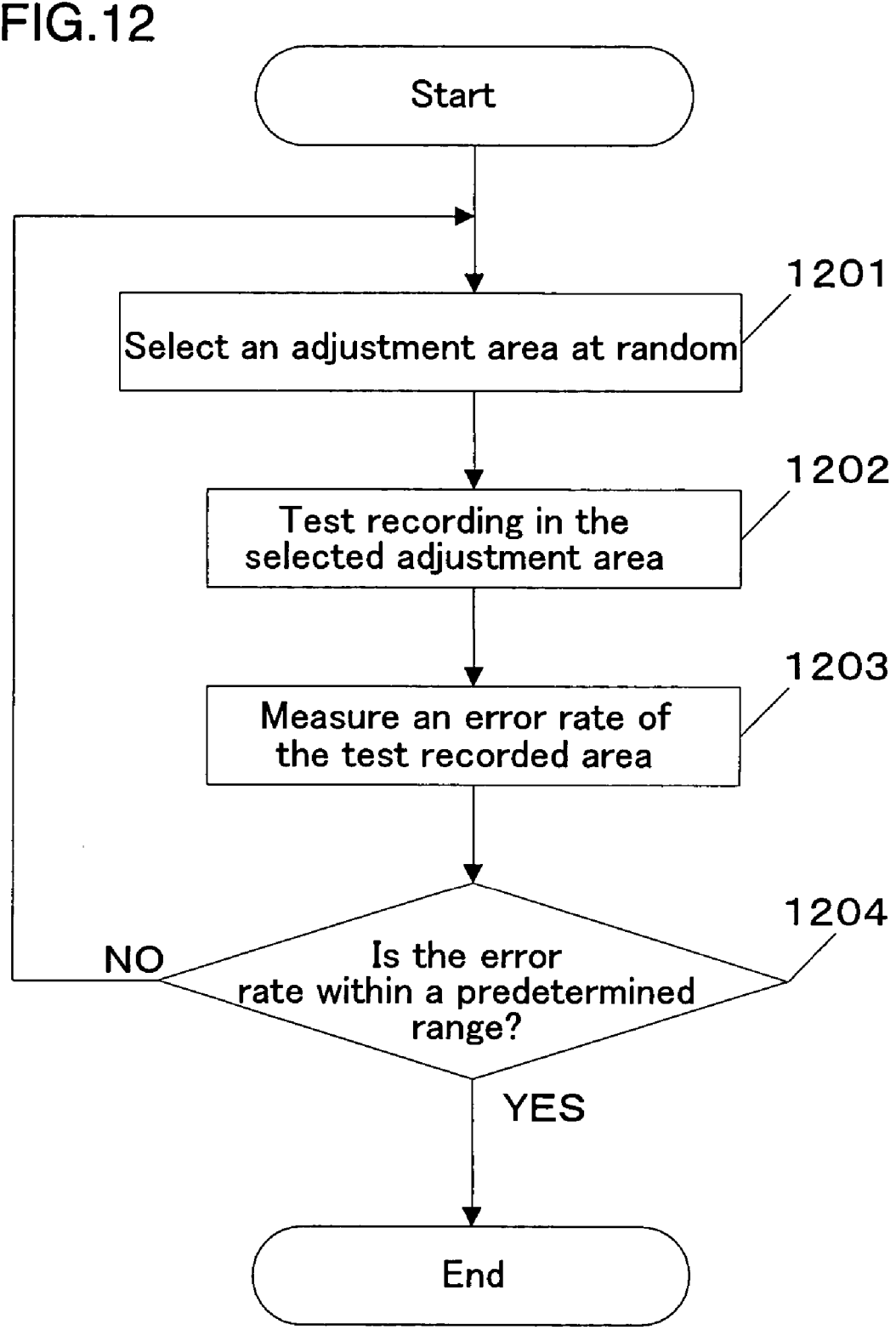
FIG. 12 is a flowchart showing a detailed procedure of the adjustment area selection.

During adjustment in step 408, particular data may be recorded in the test recording of step 1106 of FIG. 11, and when adjustment is performed subsequently, it may be confirmed whether or not the particular data can be reproduced. In this case, it is possible to determine whether or not recording has been performed in the selected adjustment area by a drive apparatus manufactured by other companies during a period of time from the previous adjustment to the current adjustment.

Next, the recording power adjustment procedure of FIG. 4 will be described using a specific example of adjustment area positional information.

In the example, recording power adjustment is performed by the optical disc apparatus 300 with respect to an optical disc, on which the adjustment area positional information 111 (#1) of FIG. 1 of Embodiment 1 is recorded. It is assumed that a current temperature is 30° C., the apparatus identification information 110 (#1) is "1234", and the apparatus identification information 110b of the optical disc apparatus 300 is "1234". Further, it is assumed that a predetermined value of adjustment area use number is 10 times, a range of adjustment temperature is ±10° C., and a resultant range of adjustment is 4.0 mW to 6.5 mW.

Step 401: a current temperature is obtained from the temperature obtaining section 310. 30° C. is obtained.

Step 402: the apparatus identification information 110 (#1) and the adjustment area positional information 111 (#1) are obtained from a disc. The apparatus identification information 110 (#1) is "1234".

Step 403: the system control section 307 obtains the apparatus identification information 110b from the apparatus identification information storage section 309. The obtained apparatus identification information 110b is "1234".

Step 404: the adjustment area positional information interpretation section 308 compares the apparatus identification information 110 (#1) with the apparatus identification information 110b. Since both are "1234", data of the Drive Area 107 is determined to be valid and the process goes to step 413.

Step 413: the adjustment area use number 113 is obtained. The adjustment area use number 113 is five times.

Step 414: it is determined whether or not the adjustment area use number is equal to or less than the predetermined value. Since the adjustment area use number 113 is equal to or less than ten times, the adjustment area is determined to be valid. The process goes to step 415.

Step 415: the adjustment area index 112 is obtained. The adjustment area index 112 is "1".

Step 416: the adjustment temperature 114 is obtained. The adjustment temperature 114 is 25° C.

Step 417: it is determined whether or not the adjustment temperature is within the predetermined range. Since the adjustment temperature 114 is within 30° C.±10° C., the adjustment parameter is determined to be valid. The process goes to step 418.

Step 418: the recording power 115 is obtained. The recording power 115 is 6.0 mW. The process goes to step 408.

Step 408: recording power adjustment is performed using the adjustment area 109 (#1), where an initial recording power value is 6.0 mW. Recording power adjustment is performed as in the conventional technology (steps 1002 to 1007). It is assumed that 5.4 mW is obtained as a result of adjustment.

Step 409: the adjustment area use number is incremented by "+1" to six times. Thereafter, it is determined whether or not the adjustment result is within the predetermined range. Since the adjustment result is within the range of 4.0 mW to 6.5 mW, the process goes to step 411.

Step 411: the adjustment result is set in the laser control section 305.

Step 412: a set of the adjustment area index value "+1", the adjustment temperature 30° C., the recording power 5.4 mW, and the apparatus identification information of an apparatus which has performed adjustment using the adjustment result, are stored as adjustment area positional information in the Drive Area 107.

According to the above-described optical disc apparatus of the present invention, adjustment area selection for adjustment can be omitted, thereby making it possible to reduce a time required for adjustment. As long as conditions which allow use of an adjustment area are satisfied, the same area can be used for adjustment. Therefore, the size of an adjustment area used for adjustment to obtain a recording power can be reduced. Therefore, the size of an area which can be used for adjustment to obtain other recording/reproduction conditions can be increased.

Note that the present invention may be implemented as a program for executing the function of the optical disc apparatus of according to Embodiment 3 of the present invention.

Embodiment 4

Figure 5:
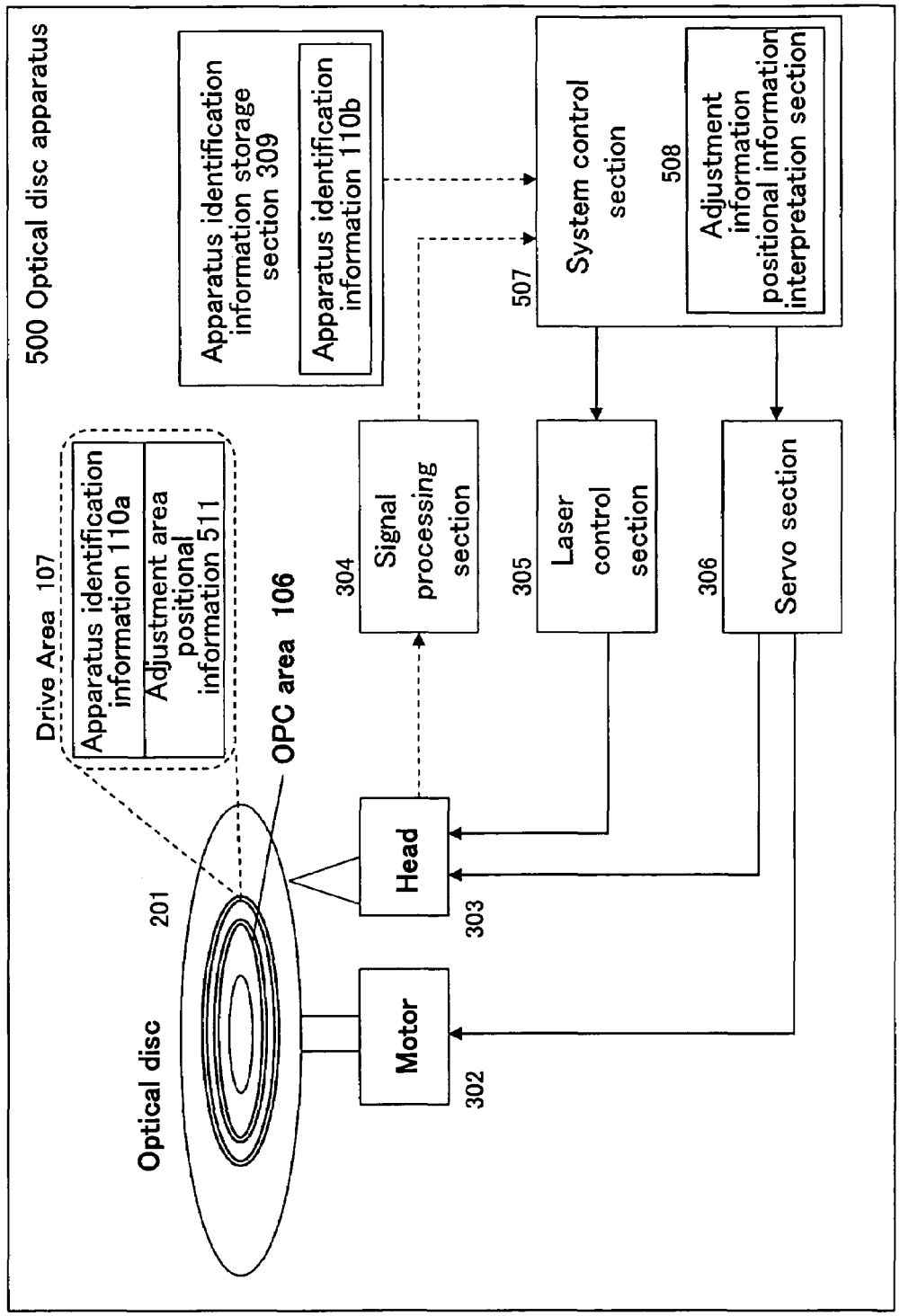
FIG. 5 is a diagram showing a configuration of an optical disc apparatus according to Embodiment 4 of the present invention.

FIG. 5 shows a configuration of an optical disc apparatus 500 according to Embodiment 4 of the present invention. The optical disc apparatus 500 is configured so that an optical disc 201 (see FIG. 2) can be loaded there into.

In FIG. 5, the same parts as those of the optical disc apparatus 300 of FIG. 3 are referenced with the same reference numerals and will not be explained.

The optical disc apparatus 500 comprises an adjustment area positional information interpretation section 508. The adjustment area positional information interpretation section 508 interprets apparatus identification information 110a and adjustment area positional information 511 on the optical disc 201 and sets an area of an OPC area 106, in which adjustment is performed, and an adjustment parameter for a system control section 507.

Figure 6:
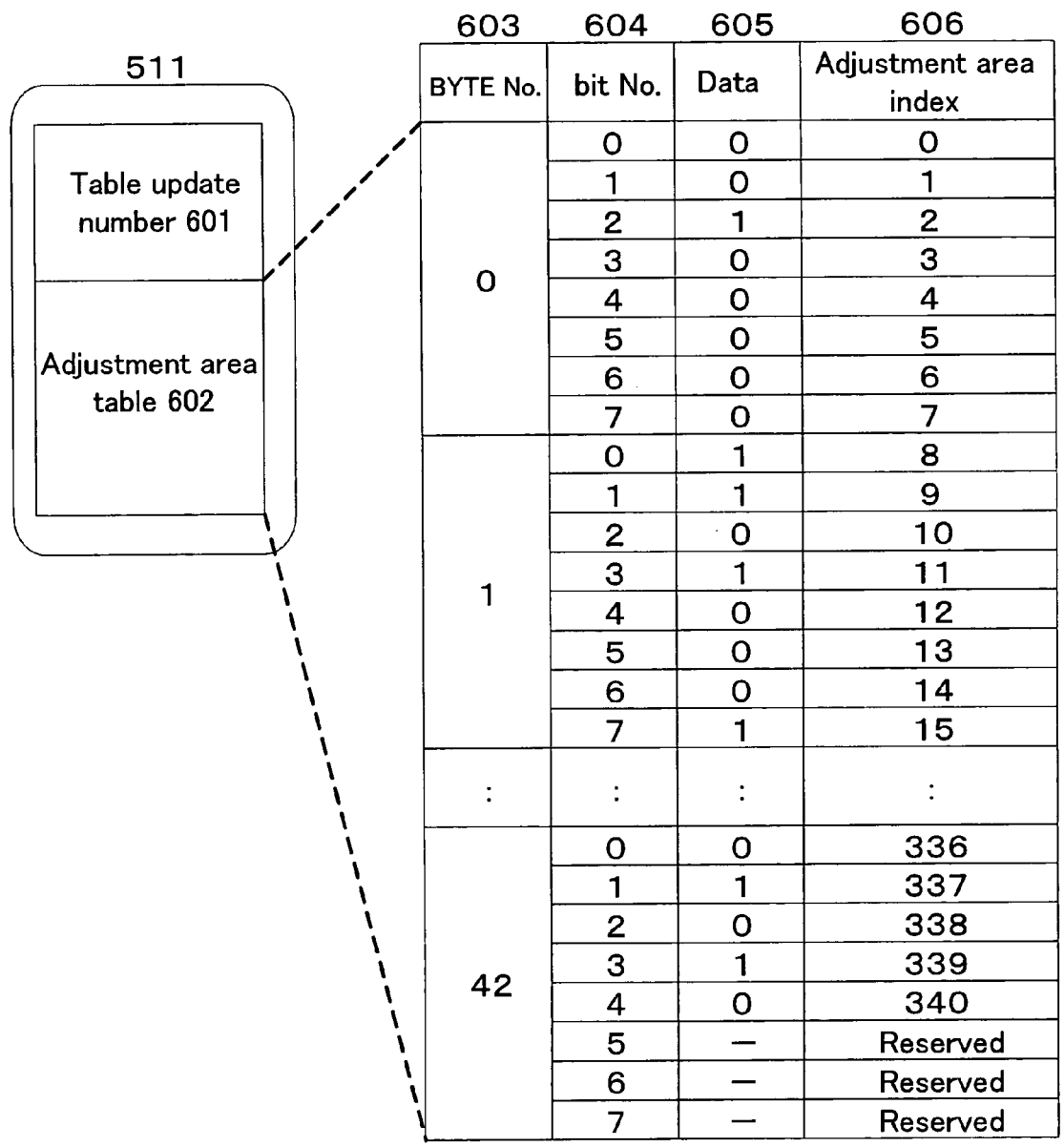
FIG. 6 is a diagram showing a detailed format of adjustment area positional information according to Embodiment 4 of the present invention.

FIG. 6 shows a detailed format of the adjustment area positional information 511 according to Embodiment 4 of the present invention.

The adjustment area positional information 511 includes a table update number 601 and an adjustment area table 602. The adjustment area table 602 is composed of 43-byte data 605. Data of each byte is given a BYTE No. (603). One-byte data is composed of 8-bit data, which is given a bit No. (604) (0 to 7). Data of each bit corresponds to #0 to #430 of the adjustment area 109 of FIG. 2. In Embodiment 4, adjustment area indexes 606 are associated with areas 0 to 340, corresponding to BYTE Nos. (603) and bit Nos. (604) in ascending order.

For example, when a bit in the data 605 is "1", an area indicated by an adjustment area index 606 corresponding to the bit is permitted to use ("OK"). When a bit in the data 605 is "0", an area indicated by an adjustment area index 606 corresponding to the bit is not permitted to use ("NG").

Figure 7:
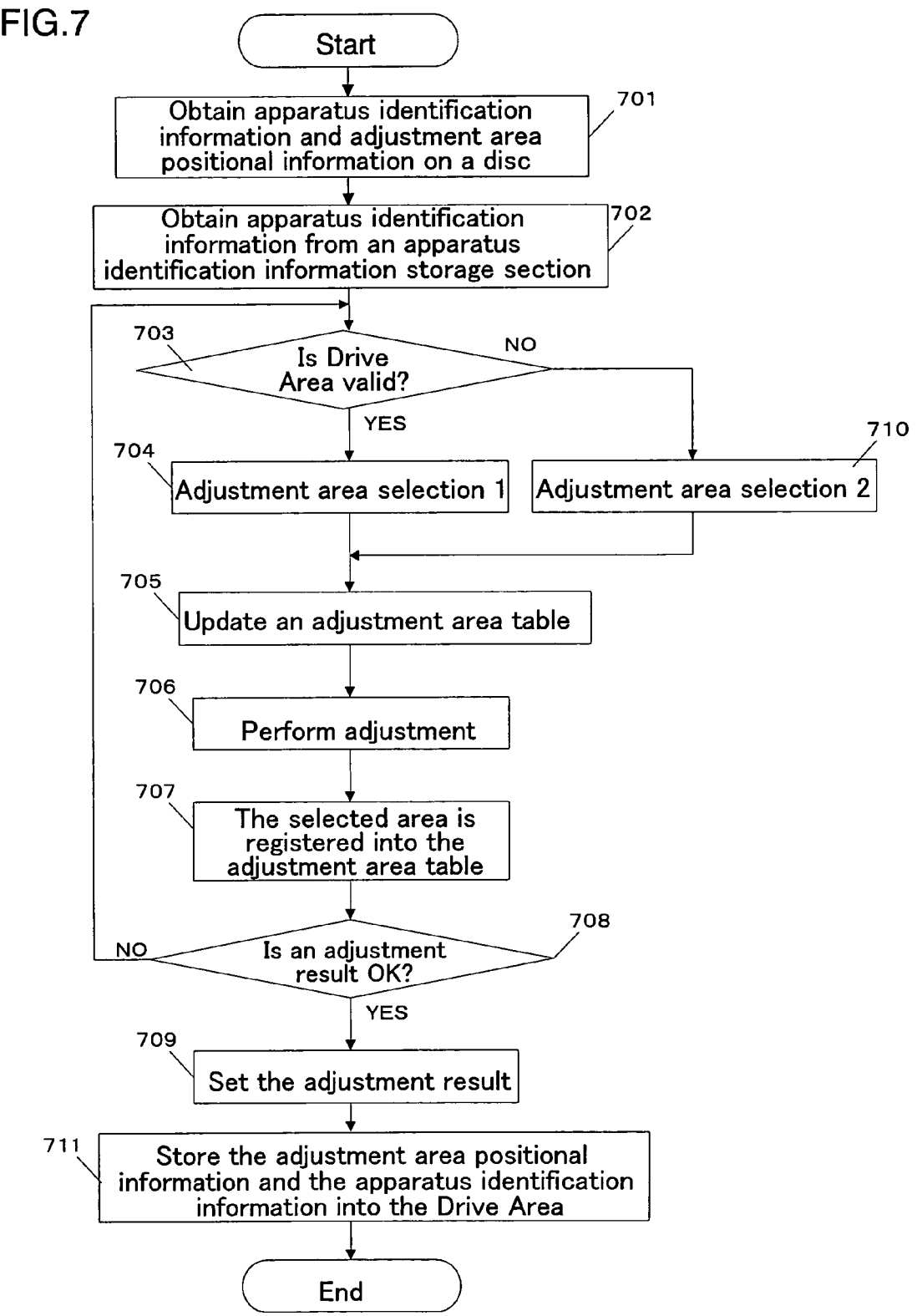
FIG. 7 is a flowchart showing a recording power adjustment procedure.

FIG. 7 shows a recording power adjustment procedure. Hereinafter, the recording power adjustment procedure will be described step by step with reference to FIGS. 2 and 5 to 7. The recording power adjustment procedure is performed with respect to the recording medium 201 by the optical disc apparatus 500.

Step 701: the apparatus identification information 110a and the adjustment area positional information 511 are obtained from the disc.

Step 702: apparatus identification information 110b is obtained from the apparatus identification information storage section 309.

Step 703: the apparatus identification information 110a is compared with the apparatus identification information 110b to determine whether or not a Drive Area 107 is valid. When the apparatus identification information 110a matches the apparatus identification information 110b so that it is determined that the Drive Area 107 is valid (YES), the process goes to step 704. When the apparatus identification information 110a does not match the apparatus identification information 110b so that it is determined that the Drive Area 107 is not valid (NO), the process goes to step 710.

Step 704: adjustment area selection 1 is performed. Thereafter, the process goes to step 705.

Step 710: adjustment area selection 2 is performed. Thereafter, the process goes to step 705.

Details of adjustment area selection 1 and adjustment area selection 2 will be described elsewhere below.

Step 705: the adjustment area table 602 is updated by replacing the previous adjustment area table with the new adjustment area table set in step 704 or 710.

Step 706: adjustment is performed. Since adjustment is performed in a manner similar to step 408 of Embodiment 3 of FIG. 4 and will not be explained.

Step 707: an area selected in step 704 or 710 is registered in the adjustment area table 602. Details of step 707 will be described elsewhere below.

Step 708: it is determined whether or not a result of adjustment is OK. When it is determined that the adjustment result is OK (YES), the process goes to step 709. When it is determined that the adjustment result is not OK (NO), the process goes to step 703, in which adjustment area selection and adjustment are repeated.

Step 709: the adjustment result is set.

Step 711: adjustment area positional information and apparatus identification information are stored into the Drive Area 107.

Figure 8:
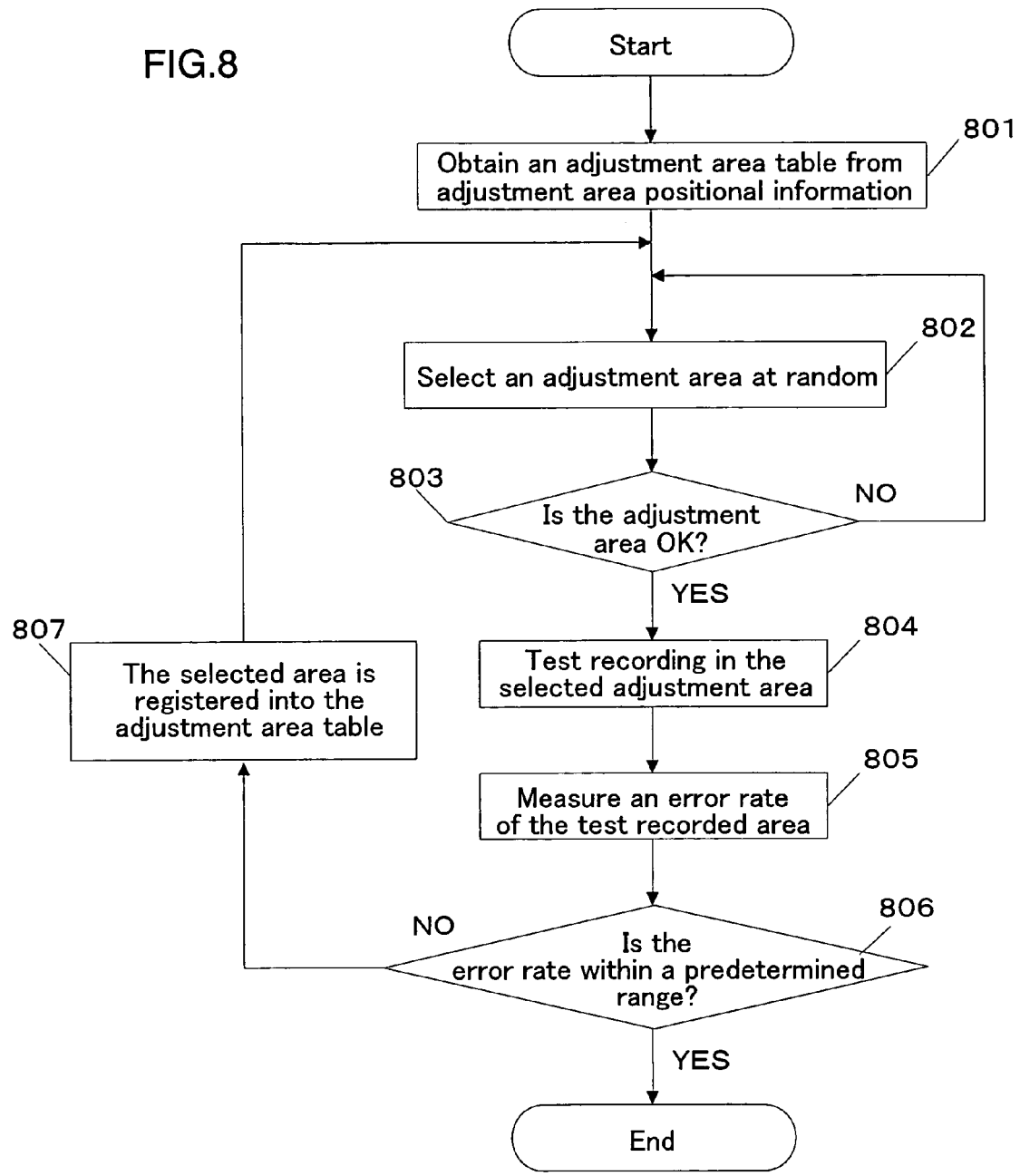
FIG. 8 is a flowchart showing a detailed procedure of adjustment area selection 1.

FIG. 8 shows a detailed procedure of adjustment area selection 1. Hereinafter, the detailed procedure of adjustment area selection 1 will be described step by step with reference to FIG. 8.

Step 801: the adjustment area table 602 is obtained from the adjustment area positional information 511.

Step 802: an adjustment area is selected at random. Note that an adjustment area may be selected in accordance with a predetermined rule, but not at random.

Step 803: it is determined whether or not the selected adjustment area is "OK" based on the data 605 ("0" or "1") corresponding to the selected adjustment area on the obtained adjustment area table. Based on a result of determination, it is determined whether or not the selected adjustment area is OK. Note that an adjustment area may be selected from areas excluding areas which are registered as "NG" on the adjustment area table 602 either randomly or regularly.

When it is determined that the selected adjustment area is OK (YES) (the selected adjustment area is registered on the adjustment area table 602), the process goes to step 804. When it is determined that the selected adjustment area is not OK (NO) (the adjustment area is not registered in the adjustment area table 602), the process then goes to step 802 and an adjustment area is selected again at random.

Step 804: test recording is performed in the selected adjustment area.

Step 805: an error rate of the test recorded area is measured.

Step 806: it is determined whether or not the measured error rate in within a predetermined range. When it is determined that the error rate is within the predetermined range (YES), the process goes to end. When the error rate is not within the predetermined range (NO), the process goes to step 807.

Step 807: the selected area is registered into the adjustment area table 602. The process goes to step 802, in which adjustment area selection is repeated. A detailed procedure of step 807 will be described elsewhere below.

Figure 9:
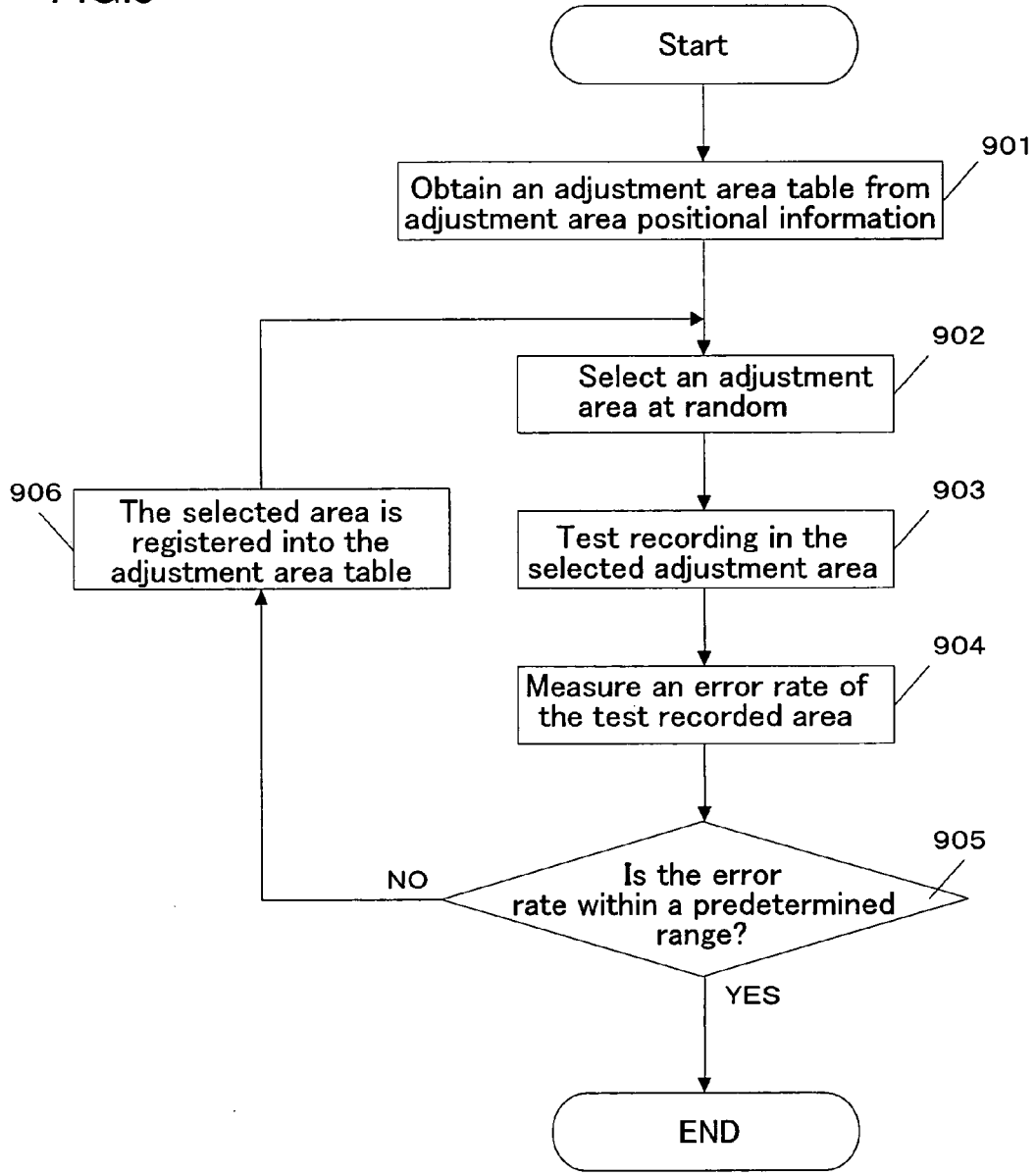
FIG. 9 is a flowchart showing a detailed procedure of adjustment area selection 2.

FIG. 9 shows a detailed procedure of adjustment area selection 2. Hereinafter, the detailed procedure of adjustment area selection 2 will be described step by step with reference to FIG. 9.

Step 901: the adjustment area table 602 is obtained from the adjustment area positional information 511.

Step 902: an adjustment area is selected at random. Note that an adjustment area may be selected in accordance with a predetermined rule, but not at random.

Step 903: test recording is performed in the selected adjustment area.

Step 904: an error rate of the test recorded area is measured.

Step 905: it is determined whether or not the measured error rate in within a predetermined range. When it is determined that the error rate is within the predetermined range (YES), the process goes to end. When the error rate is not within the predetermined range (NO), the process goes to step 906.

Step 906: the selected area is registered into the adjustment area table 602. The process goes to step 902, in which adjustment area selection is repeated. A detailed procedure of step 906 will be described elsewhere below.

Figure 10:
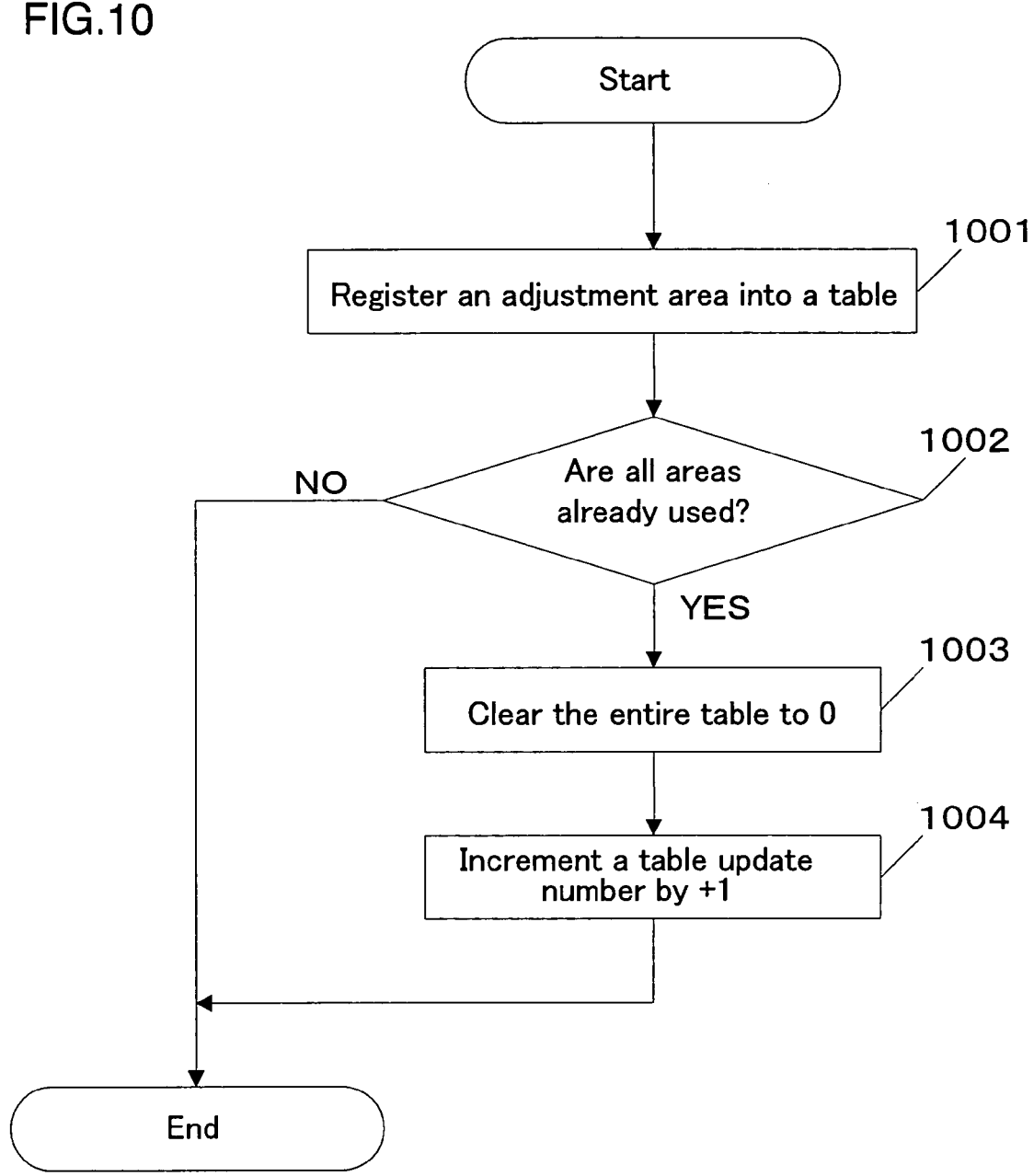
FIG. 10 is a flowchart showing a procedure for registration into an adjustment area table.

FIG. 10 shows a procedure for registration into the adjustment area table 602. With this procedure, registration into the adjustment area table 602 is performed when a selected area is used for adjustment in step 707 of FIG. 7 or when a selected area is "NG" in step 807 of FIG. 8 or step 906 of FIG. 9.

Hereinafter, the procedure for registration into the adjustment area table 602 will be described step by step with reference to FIG. 10.

Step 1001: an adjustment area, which has been determined to be "NG", is registered into the adjustment area table 602.

Step 1002: it is determined whether or not all areas on the adjustment area table 602 are already used. When all areas are not already used, the process goes to end. When all areas are already used, the process goes to step 1003.

Step 1003: all areas on the adjustment area table 602 are cleared to "0".

Step 1004: the table update number is incremented by "+1". The process goes to end.

Note that when the table update number is equal to or more than a predetermined value, adjustment area updating may be ended and it may be determined that no adjustment area to be selected remains, so that subsequent adjustment maybe stopped. This step may be performed between step 1004 and the end of the procedure.

Hereinafter, adjustment is performed using the adjustment area positional information of FIG. 6 in the optical disc apparatus 500 of FIG. 5, as described below with reference to FIGS. 5 to 8 and 10.

It is assumed that the apparatus identification information 110a stored in the Drive Area 107 matches the apparatus identification information 110b stored in the apparatus identification information storage section 309. Subsequent steps after it is determined that the Drive Area 107 is valid in step 703 of FIG. 7 will be described.

Step 704: adjustment area selection is performed.

Step 801 (FIG. 8): the adjustment area table 602 (FIG. 6) is obtained from the adjustment area positional information 511.

Step 802: an adjustment area is selected at random. It is assumed that the randomly selected adjustment area is "2".

Step 803: the value of data 605 (BYTE NO. (603): "0"; bit No. (604): "2") is "1" where the adjustment area index 606 on the adjustment area table 602 is "2". Therefore, it is determined that the area selected in step 802 is "NG". The process returns to step 802, in which adjustment area selection is performed again. It is assumed that an adjustment area selected randomly again in step 802 is "10". In this case, the value of data 605 (BYTE No. (603): "1"; bit No. (604): "3") is "0" where the adjustment area index 606 on the adjustment area table 602 is "10". Therefore, it is determined that the area selected in step 802 is "OK", the process goes tot step 804.

Step 804: test recording is performed in the area selected in step 802.

Step 805: an error rate of the area in which test recording is performed in step 804 is measured.

Step 806: it is determined whether or not the error rate measured in step 805 is within a predetermined range. It is assumed that the error rate measured in step 805 is within the predetermined range. Therefore, adjustment area selection 1 of step 704 of FIG. 7 is ended.

Step 705: the adjustment area table 602 is updated by replacing the previous adjustment area table with the new adjustment area table set in step 704.

Step 706: adjustment is performed. Since adjustment is performed in a manner similar to that described in Embodiment 3, it will not be explained.

Step 707: the adjustment area table 602 is updated. Updating of the adjustment area table 602 will be described with reference to FIG. 10. In step 1001, an adjustment area is registered onto the adjustment area table 602. In the above-described assumption, since the adjustment area selected in step 802 is "10", the data 605 of the adjustment area table 602 is updated from "0" to "1". Next, instep 1002, it is determined whether or not all adjustment areas are already used. It is determined whether or not all data 605 on the adjustment area table 602 is "1". Since all data is not "1", it is determined that all data is not already used. Therefore, updating of the adjustment area table 602 is ended. Next, in step 708, it is determined whether or not a result of adjustment is OK. Here, it is assumed that the result is OK. In step 709, the adjustment result is set into the laser control section 305. Thereafter, in step 710, the adjustment area positional information 511 and the apparatus identification information 110b are recorded into the Drive Area 107. Adjustment is ended.

According to the above-described optical disc apparatus 500 of the present invention, an area having a smallest number of times of use can be selected as an area used for adjustment from all adjustment areas. Therefore, high precision adjustment can be performed with less influence from a degradation in a recording medium due to previously performed recording. Note that it may be determined whether or not adjustment is one which is performed with recording. When adjustment is one for reproduction which is not performed with recording, an area used in the previous adjustment may be used to speed up adjustment as described in Embodiment 3. When adjustment is one which is performed with recording, an adjustment area table is used to select, as an adjustment area, an area which has a small number of times of adjustment and is less affected by a degradation in a recording medium as described in Embodiment 4, may be used, resulting in high precision adjustment.

Note that the present invention may be implemented as a program for executing the function of the optical disc apparatus according to Embodiment 4 of the present invention.

Although recording power adjustment has been described in Embodiments 1 to 4, the adjustment of the present invention may be applied to other conditions or parameters. For example, a recorded area (e.g., a data area) may be set as adjustment area positional information. Adjustment area selection may be omitted for focus balance adjustment (servo adjustment) using a recorded area in which recording is previously performed, thereby speeding up adjustment and saving a test write area. Alternatively, an unrecorded area in which erase is previously performed (e.g., a data area) may be set as adjustment area positional information. Adjustment area selection may be omitted for tracking gain adjustment which is servo adjustment using an unrecorded area, thereby speeding up adjustment and saving a test write area. Further, as the above-described recorded or unrecorded area, a DMA area, a disc information area or a Drive Area disc, which are known to be recorded or unrecorded, may be used.

Embodiment 5

In Embodiment 5 of the present invention, a method for performing servo/signal adjustment using the information recording medium of the present invention will be described.

Servo/signal adjustment includes adjustment which requires a recorded area for performing adjustment, such as focus balance adjustment for adjusting convergence of a light beam spot using a reproduced signal from a recorded area as a reference. In focus balance adjustment, a relationship between characteristics of a focus error signal and an optimum state of adjustment is deviated due to a change in temperature, so that adjustment needs to be performed again when a change in temperature occurs.

Such adjustment is called temperature adjustment. Temperature adjustment is performed during AV recording/reproduction. Therefore, when an adjustment time is long, AV data reproduction may be disturbed, recording may be skipped, or a time required for performing user data recording is long. Therefore, the adjustment time needs to be reduced.

However, when an information recording medium is loaded into an optical disc apparatus, the optical disc apparatus cannot know where a recorded area is located in a user area of the information recording medium. Therefore, conventionally, a recorded area which is created in adjustment when starting up, a DMA area which is known to be recorded, or the like is used for adjustment. Therefore, when temperature adjustment is performed, a time required to move to the recorded area poses a large obstacle to a reduction in adjustment time.

Therefore, in Embodiment 5, a method for reducing a time required to shift to an adjustment area for temperature adjustment of servo/signal, will be described.

Figure 13:
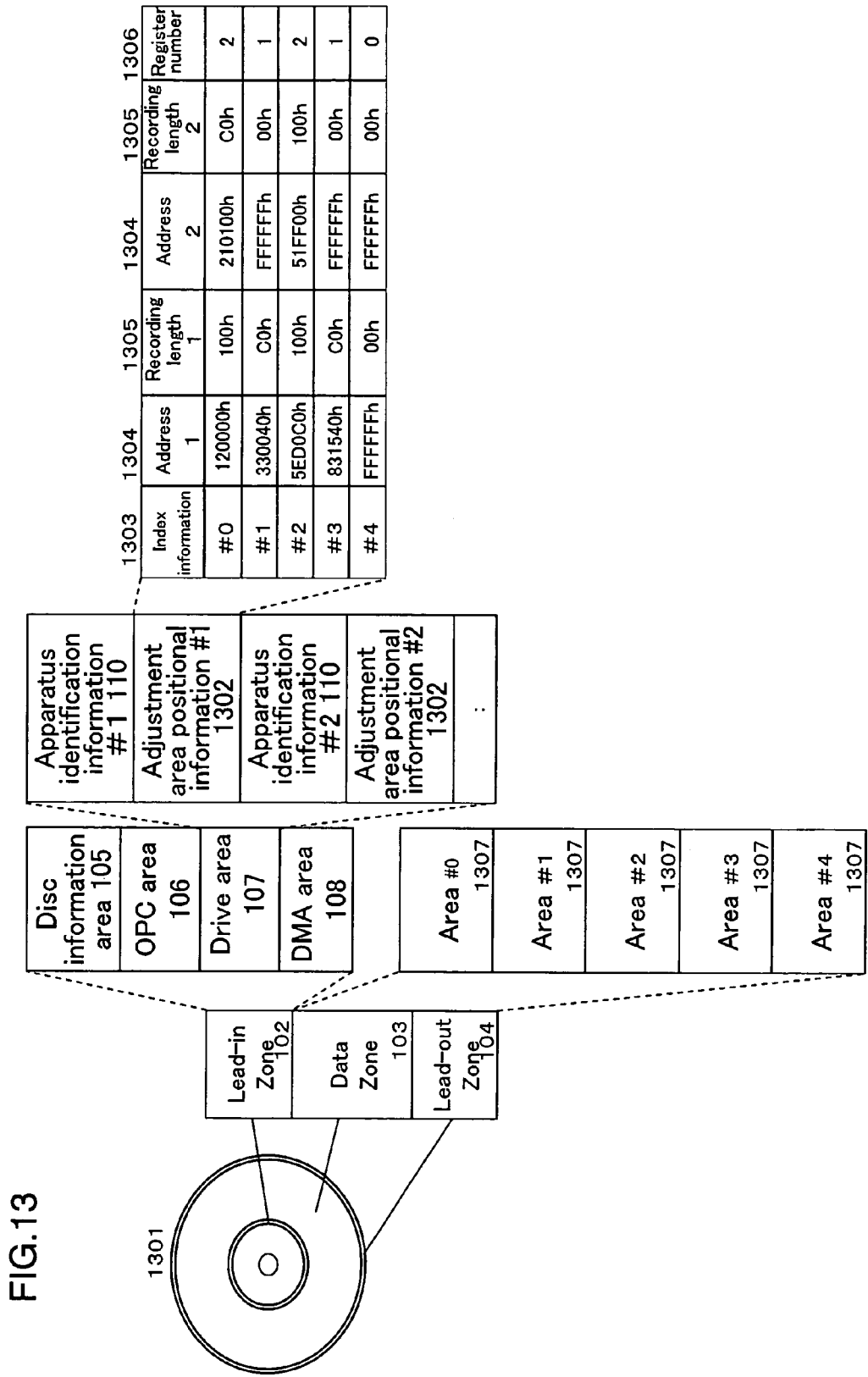
FIG. 13 is a flowchart showing a structure of a recording medium according to Embodiment 5 of the present invention.

FIG. 13 shows a structure of a recording medium 1301 according to Embodiment 5 of the present invention. The recording medium 1301 may be any optical disc (e.g., a Blu-ray Disc). In FIG. 13, the same parts as those of the recording medium 101 of FIG. 1 are referenced with the same reference numerals and will not be explained.

A adjustment area positional information 1302 is stored in a Drive Area 107. A Data Zone 103 is divided into five areas, and each area 1307 is associated with an index number (#0 to #4 in FIG. 13).

The adjustment area positional information 1302 includes index information 1303 indicating areas 1307 (#0 to #4), address information 1304 of first and second areas of the area 1307 in which recording is already performed, recording lengths 1305 of the first and second areas, and a register number 1306 indicating the number of registered areas recorded in the area 1307. In Embodiment 5, for an unrecorded area, "FFFFFFh" is registered in the address information 1304 and "00h" is registered in the recording length 1305.

According to an information recording medium having the above-described adjustment area positional information, temperature adjustment for absorbing an influence of a drive or disc due to a change in temperature (e.g., focus balance adjustment without recording) is performed as follows. Adjustment is performed in an area closest to a current position among recorded areas registered in the adjustment area positional information 1302, thereby making it possible to reduce a seek time and a time required to perform temperature adjustment. By performing adjustment in an area closest to a current position of areas belonging to the same area including the current position, adjustment is performed in an area having characteristics close to those of the optical disc, thereby making it possible to obtain a more desirable adjustment result.

An area used for temperature adjustment may be an area which requires the least time to shift thereto or any area registered in the adjustment area positional information 1302. Although the maximum number of registered areas is 2 in Embodiment 5, the present invention is not limited to this and the maximum number of registered areas may be any number.

Figure 14:
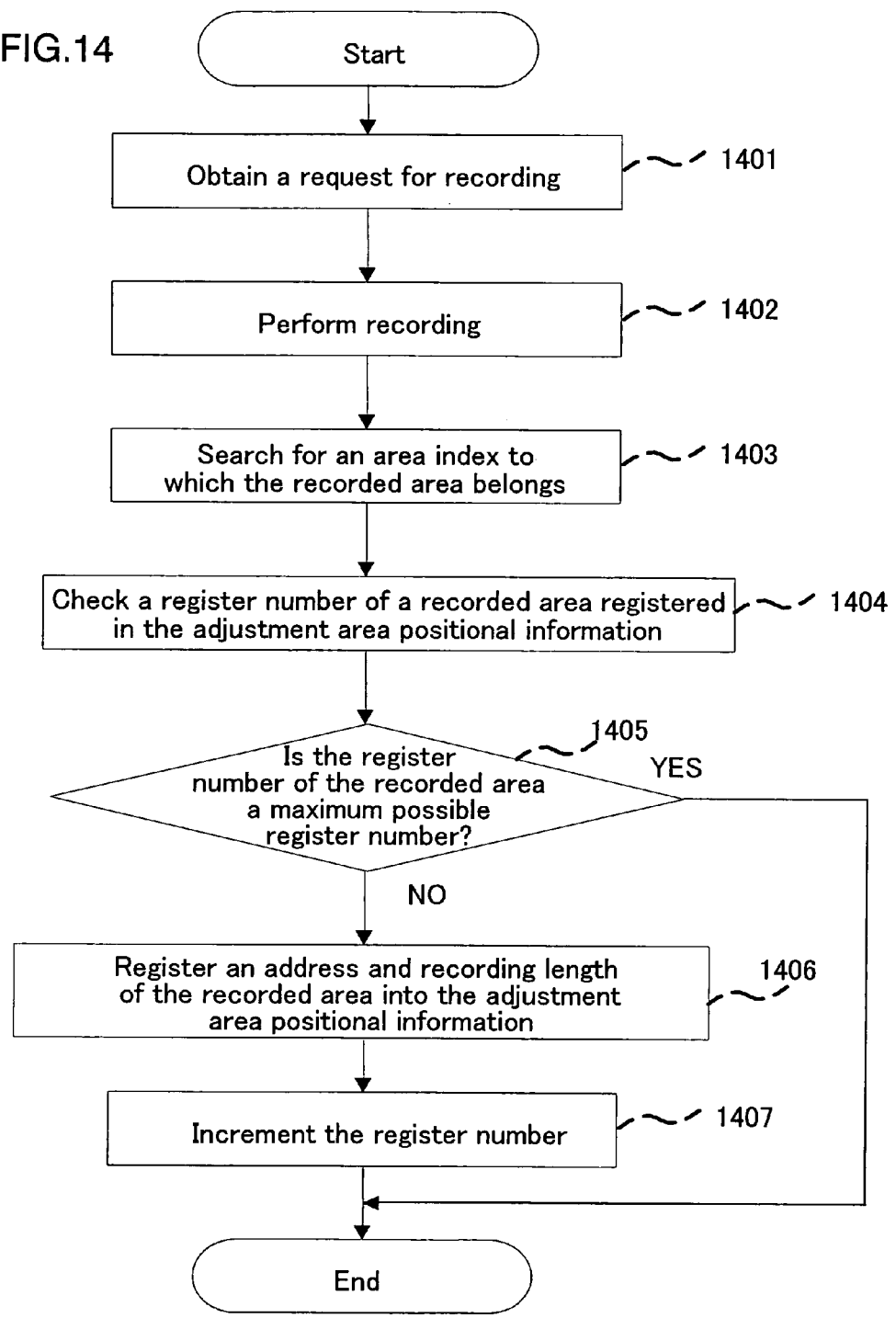
FIG. 14 is a flowchart showing a procedure for registering a recorded area into the information recording medium of FIG. 13.

FIG. 14 shows a procedure for registering a recorded area into the information recording medium 1301. Hereinafter, the procedure for registering a recorded area into the information recording medium 1301 will be described step by step with reference to FIGS. 5 and 14. This procedure is performed by the optical disc apparatus 500.

It is assumed that data of the adjustment area positional information 1302 is cached in a memory (not shown) in the optical disc apparatus 500 when starting up or when a recorded area is registered. In this case, data can be referenced and updated without reproducing the information recording medium 1301 (the data needs to be subsequently recorded into a Drive Area to update information on the recording medium 1301).

Step 1401: the system control section 507 receives a request for recording from a host apparatus (not shown). The recording request includes a recording start address and a recording length as arguments.

Step 1402: the system control section 507 receives data from a host apparatus and executes recording as follows. The system control section 507 instructs the servo section 306 to seek an area to be recorded. After seeking the recording area, the system control section 507 instructs the laser control section 305 to transfer recording data and emit laser light corresponding to the recording data.

Step 1403: it is determined in which area in the Data Zone 103 of the optical disc 1301 an area in which confirmation that recording is completed and recording have been performed belongs to. The confirmation that recording is completed is performed by verification of an area in which recording has been performed.

Step 1404: the adjustment area positional information 1302 is checked to confirm the register number 1306 in the index information 1303 of the obtained recorded area.

Step 1405: it is determined whether or not the confirmed register number 1306 is a maximum possible register number (2 in Embodiment 5). When it is determined that the register number 1306 is the maximum possible register number (YES), the process goes to end. When the register number 1306 is not the maximum possible register number (NO), the process goes to step 1406.

Step 1406: an address and recording length of a recorded area are registered in an unrecorded area of an area corresponding to the index information 1303, which is obtained in step 1403, in the adjustment area positional information 1302.

Step. 1407: the register number 1306 of the adjustment area positional information 1302 is incremented. The process goes to end.

The updated adjustment area positional information 1302 is recorded into the Drive Area 107 of the information recording medium 1301 when the access is not performed for a predetermined period of time or when the information is no recorded if the system control section 507 is requested for spinning down.

Recording in step 1402 may not be performed immediately after receiving a recording request in step 1401, and may be performed in time depending on the state of a recording data buffer or the state of an operation of the optical disc apparatus.

Confirmation that recording is completed may be performed by measuring an RF amplitude signal, an error rate or the like of an area in which recording has been performed. When a recording command is normally ended, it may be determined that recording is normally completed.

It is assumed that a recorded area is tried to be registered into the adjustment area positional information 1302. When an area contiguous to the area to be currently registered is already registered, the registered area may be coupled with the area to be currently registered and the coupled area may be overwritten and registered into the registered area in the adjustment area positional information 1302.

When a recorded area is registered into the adjustment area positional information 1302 in step 1406, a predetermined value, such as a recording length or the like, which is required for adjustment, may be provided and it may be determined in registration whether or not a recording length is equal to or more than the predetermined value. When the recording length is not equal to or less than the predetermined value, registration may not be performed.

Timing of recording the Drive Area 107 of the adjustment area positional information 1302 is not limited to the above-described timing and may be any timing in which recording can be performed on the information recording medium 1301.

Figure 15:
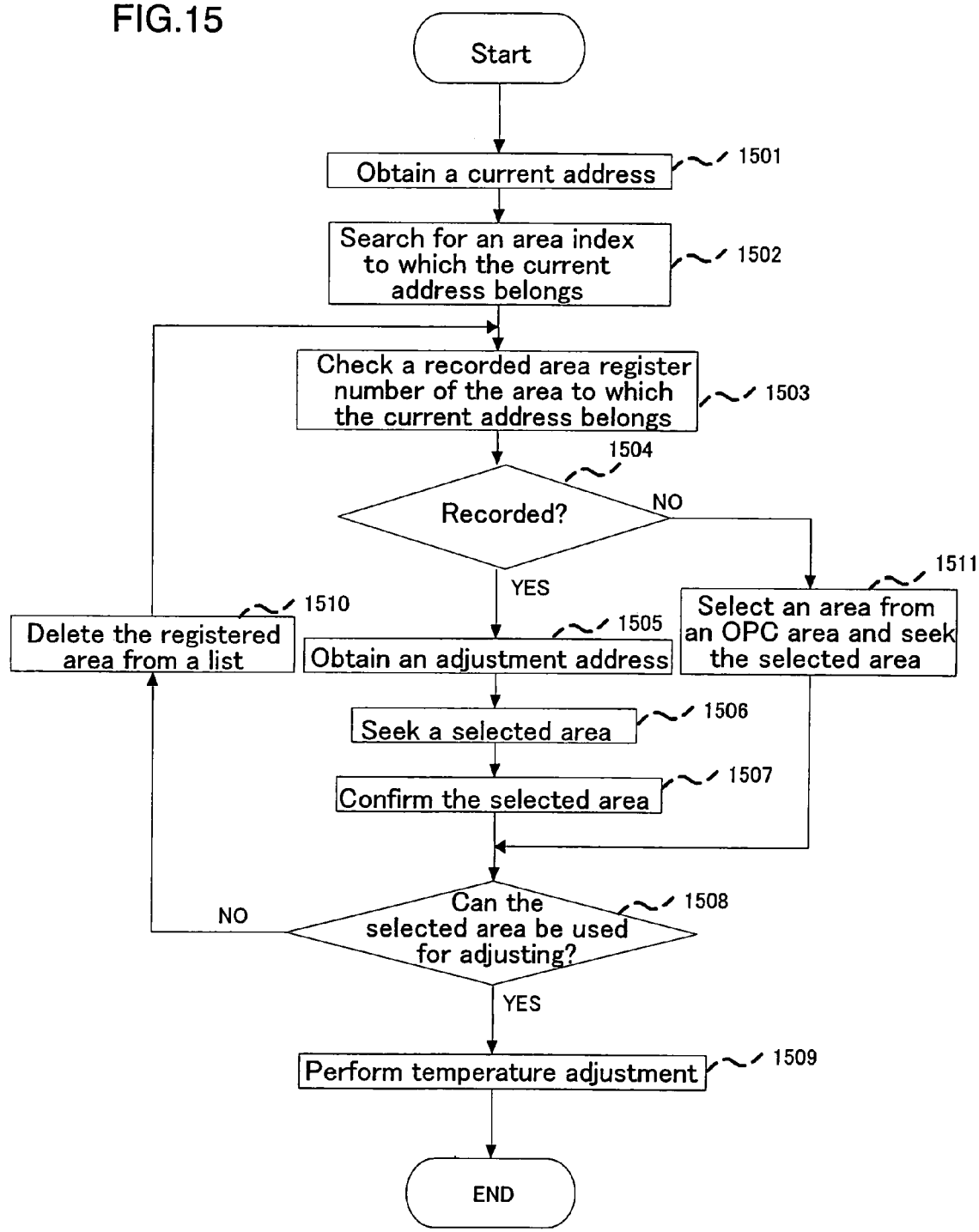
FIG. 15 is a flowchart showing a procedure for performing temperature adjustment with respect to the recording medium of FIG. 13 when the optical disc apparatus of FIG. 5 detects a predetermined change in temperature.

FIG. 15 shows a procedure for performing temperature adjustment with respect to the recording medium 1301 when the optical disc apparatus 500 detects a predetermined change in temperature.

Hereinafter, the procedure for performing temperature adjustment with respect to the recording medium 1301 will be described step by step with reference to FIG. 15.

Step 1501: address information of a current position is obtained. The address information is obtained based on a data ID of recorded data or wobble information of a track.

Step 1502: an area index 1303 to which the address of the current position belongs is determined.

Step 1503: the adjustment area positional information 1302 is searched to confirm a register number of a recorded area belonging to an area having the determined area index 1303.

Step 1504: it is determined whether or not the recorded area is registered. When it is determined that the recorded area is registered (YES), the process goes to step 1505. When it is determined that the recorded area is not registered (NO), the process goes to step 1511.

Step, 1505: an address of the recorded area is obtained from the adjustment area positional information 1302.

Step 1506: the optical head is shifted to an area indicated by the obtained address.

Step 1507: an area indicated by the obtained address is confirmed by measuring an RF signal or an error rate of the area.

Step 1508: it is determined whether or not a result of confirmation is OK. When it is determined that the confirmation result is OK (YES), the process goes to step 1509. When the confirmation result is OK (NO), the process goes to step 1510.

Step 1509: temperature adjustment is performed in the obtained area. The process then goes to end.

Step 1510: the obtained recorded area is deleted from the adjustment area positional information 1302. Deletion of the recorded area is performed by registering "FFFFFFh" to the address information 1304 and "00h" to the recording length 1305 as described regarding the adjustment area positional information 1302 with respect to FIG. 13. After deletion of the recorded area, the process goes to step 1503 and the step is repeated.

Step 1511: an area to be used for adjustment is selected from the OPC area 106 and the optical head is shifted to the area (seeking). Thereafter, steps 1508 and 1509 are performed.

Confirmation of an area in step 1507 may be performed by the above-described measurement at the same time as signal measurement performed in adjustment, or before or after adjustment. Alternatively, the area confirmation may be determined to be "OK" by determining that the adjustment result is satisfactory.

When a recorded area is not present in an area to which a current head position belongs in step 1504, an area closest to the current head position in terms of a radial position may be selected, or an area which can be accessed in a shortest time from the current head position may be selected in terms of a shift time of a traverse motor, a settling time of a spindle motor, or the like.

Examples of temperature adjustment in step 1509 include focus balance adjustment performed in a recorded area and other adjustment using a recorded area. The present invention may be applied to not only temperature adjustment but also adjustment, such as tilt adjustment when starting up or the like, which is dependent on a disc radial direction and cannot be performed in a disc inner periphery.

Further, when the optical disc apparatus 500 is started up again, the optical disc apparatus 500 obtains an address of a recorded area. When adjustment is required during recording/reproduction of the Data Zone 103 by the optical disc apparatus 500, adjustment is performed with reference to a previously obtained address. As a result, a seek time can be further reduced.

In the above-described embodiment, a user area is divided into a plurality of areas and a recorded area is registered. By providing two reference positions spaced in a radial direction as equally as possible, adjustment may be performed using a recorded area closest to the reference position closest to a current head position, whereby tilt adjustment dependent on a radial position can be achieved.

As described above, according to the optical disc apparatus of the present invention, an area known to be recorded is registered into adjustment area positional information, and temperature adjustment can be performed using the area registered in the adjustment area positional information without shifting to an OPC area. Therefore, a time required for adjustment can be reduced, resulting in real-time recording and high-speed user data recording.

Embodiments of the present invention have been heretofore described with reference to the drawings.

Each section in the optical disc apparatus described above may be implemented as hardware or software or in combination thereof. In any case, the procedure of the present invention can be performed.

The procedure of the present invention may be any procedure as long as the above-described steps can be performed.

The optical disc apparatus of the present invention may store a program for executing a function of the optical disc apparatus.

The program may be previously stored in a storage section of the optical disc apparatus before shipment. Alternatively, after shipment of the optical disc apparatus, the program may be stored into the storage section. For example, the program may be downloaded by the user from a particular website on the Internet with or without payment, and the downloaded program may be installed into the optical disc apparatus.

When the program is stored in a computer readable recording medium, such as a flexible disc, a CD-ROM, a DVD-ROM or the like, the program may be installed into the optical disc apparatus via an input apparatus. The program may be installed into the storage section.

The information recording medium, access apparatus, access method, and program of the present invention can be applied to, for example, an access apparatus (e.g., an optical disc recorder) which requires high-speed or high-precision adjustment of access conditions.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

What is claimed is:

1. A recording medium, comprising at least one recording area, wherein
the at least one recording area is composed of at least one adjustment area and at least one positional information recording area,
the at least one adjustment area is an area for adjustment an access parameter for accessing the recording medium, and
positional information indicating a position of the at least one adjustment area is recorded in the at least one positional information recording area.

2. A recording medium according to claim 1, wherein
data for adjusting the access parameter is recorded in the at least one adjustment area, and
usability information indicating whether or not each of the at least one adjustment areas can be used is recorded in the at least one positional information recording area.

3. A recording medium according to claim 1, wherein
data for adjusting the access parameter is recorded in the at least one adjustment area, and
the positional information indicates a position of an adjusted area in which the access parameter is already adjusted, and
usability information indicating whether or not each of the at least one adjustment areas can be used is recorded in the at least one positional information recording area.

4. A recording medium according to claim 2 or 3, wherein
the positional information and the usability information correspond to each other, and
the, usability information includes information indicating the number of times of adjustment in the adjustment area.

5. A recording medium according to claim 2 or 3, wherein
the positional information and the usability information correspond to each other, and
the usability information includes a value of measuring a signal for determining the usability of the adjustment area.

6. A recording medium according to claim 2 or 3, wherein
the positional information and the usability information correspond to each other, and
the usability information includes a bit sequence indicating the usability of the adjustment area.

7. A recording medium according to claim 1, wherein
the at least one recording area includes at least one recorded area, and
the positional information includes recorded area information indicating a position of the at least one recorded area.

8. A recording medium according to claim 7, wherein
the at least one recording area is divided into a plurality of areas in a radial direction of the recording medium, and
the positional information includes information indicating a position of a recorded area included in each of the plurality of areas.

9. A recording medium according to claim 1, wherein
the at least one recording area is constructed to include an identification information recording area for recording identification information of an apparatus, the apparatus having been used for recording the positional information.

10. A recording medium according to claim 1, wherein
the at least one positional information recording area includes a parameter for adjustment, the adjustment parameter corresponding to the positional information.

11. A recording medium according to claim 10, wherein
the positional information recording area includes adjustment parameter usability information indicating whether or not the adjustment parameter can be used.

12. A recording medium according to claim 11, wherein
the adjustment parameter usability information includes temperature information indicating a temperature when adjustment has been performed in the at least one adjustment area.

13. A recording medium according to claim 11, wherein
the adjustment parameter usability information includes time information indicating a time when adjustment has been performed in the at least one adjustment area.

* * * * *